(12) United States Patent
Bidner et al.

(10) Patent No.: US 11,002,493 B2
(45) Date of Patent: May 11, 2021

(54) SYSTEMS AND METHODS FOR THERMAL BATTERY CONTROL

(71) Applicant: Ford Global Technologies, LLC, Dearborn, MI (US)

(72) Inventors: David Karl Bidner, Livonia, MI (US); Michael Levin, Ann Arbor, MI (US); Phillip Bonkoski, Ann Arbor, MI (US); W. Cary Cole, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1049 days.

(21) Appl. No.: 15/246,176

(22) Filed: Aug. 24, 2016

(65) Prior Publication Data

US 2018/0058769 A1 Mar. 1, 2018

(51) Int. Cl.
*F28D 20/02* (2006.01)
*F28F 27/00* (2006.01)
(Continued)

(52) U.S. Cl.
CPC ....... *F28D 20/028* (2013.01); *B60H 1/00492* (2013.01); *B60H 1/20* (2013.01); *F28D 20/021* (2013.01); *F28D 20/025* (2013.01); *F28D 20/026* (2013.01); *F28F 27/00* (2013.01); *F28D 20/003* (2013.01); *F28D 2020/0078* (2013.01); *F28D 2021/008* (2013.01); *F28F 2265/12* (2013.01); *Y02E 60/14* (2013.01)

(58) Field of Classification Search
CPC ........ B60H 1/00492; B60H 1/00; B60H 1/02; F28F 2265/12; F28D 20/02; F28D 20/025; F28D 20/026; F28D 20/028; F28D 20/021
See application file for complete search history.

(56) References Cited

U.S. PATENT DOCUMENTS

| | | | | | |
|---|---|---|---|---|---|
| 2,229,437 | A | * | 1/1941 | Birdsall | F17C 3/02 62/165 |
| 5,385,214 | A | * | 1/1995 | Spurgeon | B60K 3/00 165/902 |

(Continued)

FOREIGN PATENT DOCUMENTS

| | | | |
|---|---|---|---|
| JP | H0849934 A | * | 2/1996 |
| JP | 2006275449 A | * | 10/2006 |
| WO | 2014191778 A1 | | 12/2014 |

OTHER PUBLICATIONS

Bidner, David Karl, et al., "Systems and Methods for Thermal Battery Control," U.S. Appl. No. 15/008,226, filed Jan. 27, 2016, 69 pages.

*Primary Examiner* — Travis C Ruby
*Assistant Examiner* — Harry E Arant
(74) *Attorney, Agent, or Firm* — Geoffrey Brumbaugh; McCoy Russell LLP

(57) ABSTRACT

Methods and system for operating a thermal storage device of a vehicle system are provided. In one example, a method comprises determining a state of charge of the thermal battery based on an accurate estimation of a melting temperature of one or more phase change materials (PCMs) at a specific aggregate pressure inside the thermal storage device. Variation in melting temperature of the PCM may be minimized by reducing pressure variation inside the thermal storage device by regulating a position of one or more pressure relief valves of the thermal storage device.

19 Claims, 8 Drawing Sheets

(51) Int. Cl.
  *B60H 1/00*   (2006.01)
  *B60H 1/20*   (2006.01)
  *F28D 20/00*   (2006.01)
  *F28D 21/00*   (2006.01)

(56) References Cited

U.S. PATENT DOCUMENTS

| | | |
|---|---|---|
| 6,362,598 B2 | 3/2002 | Laig-Horstebrock et al. |
| 6,464,027 B1 * | 10/2002 | Dage ................... B60H 1/004 |
| | | 123/41.14 |
| 6,624,615 B1 | 9/2003 | Park |
| 7,225,860 B2 | 6/2007 | Baginski et al. |
| 7,490,581 B2 | 2/2009 | Fishman |
| 2004/0154784 A1 | 8/2004 | Pause |
| 2004/0159119 A1 * | 8/2004 | Hu ........................ B64D 13/00 |
| | | 62/435 |
| 2007/0290056 A1 | 12/2007 | Fishman |
| 2008/0003491 A1 | 1/2008 | Yahnker et al. |
| 2010/0252232 A1 * | 10/2010 | Reich ..................... F25B 39/02 |
| | | 165/48.1 |
| 2011/0041892 A1 * | 2/2011 | Levin ................... H01L 31/0521 |
| | | 136/246 |
| 2012/0244399 A1 | 9/2012 | Tartaglia |
| 2014/0374058 A1 * | 12/2014 | Greiner ............. B60H 1/00492 |
| | | 1/492 |
| 2016/0195340 A1 * | 7/2016 | Bissell .................. F28D 20/021 |
| | | 165/10 |

* cited by examiner

SYSTEMS AND METHODS FOR THERMAL BATTERY CONTROL

FIELD

The present description relates generally to methods and systems for thermal energy storage in a vehicle.

BACKGROUND/SUMMARY

To enhance warming of various vehicle system components, thermal energy storage devices have been developed to store thermal energy produced by the vehicle system for later use. These thermal storage devices typically include a phase change material (PCM) that may store a significant amount of thermal energy as latent heat at the phase change temperature of the PCM. In one example approach disclosed in US 2004/0154784, phase change materials such as paraffin wax may be included in a thermal battery in the interior of a vehicle to conserve energy while providing heat to the passenger compartment.

However, the inventors herein have recognized potential issues with such systems. As one example, the pressure of the thermal battery may not be regulated. For example, the PCM material may be sealed inside the thermal battery without any means of regulating a pressure inside the thermal battery. As such, the melting temperature of the PCM varies with pressure and may be altered due to pressure variation inside the thermal battery. Consequently, latent heat trapping capacity of the PCM may be altered, resulting in inaccurate estimation of a state of charge of the thermal battery. This can lead to inefficient thermal battery charging.

In one example, the issues described above may be addressed by a method comprising: estimating an aggregate pressure of a thermal battery coupled to an engine coolant system as a function of each of an ambient pressure and a pressure of coolant circulating through the thermal battery, and determining a state of charge of the battery based on a melting temperature and one or more chemical properties of at least one phase change material (for example, two or more phase change materials) included within the thermal battery, the melting temperature inferred based on the estimated aggregate pressure. In this way, a melting temperature of the thermal battery may be determined more reliably. In one example, pressure inside a PCM chamber of a thermal battery may be regulated through at least one venting valve along a wall of the PCM chamber. At least one venting valve may fluidically connect the PCM chamber to a coolant system that may be in heat exchange relationship with the PCM. In another example, the venting valve may fluidically connect the PCM chamber to atmosphere. Opening or closing of the venting valve may be regulated to minimize pressure variation inside the PCM chamber, which may maintain a melting temperature of the PCM. Based on the melting temperature of the PCM, an accurate state of charge of the thermal battery may be determined for subsequent charging of the thermal battery.

In another example, a controller may determine a melting temperature of a PCM inside a PCM chamber of a thermal battery based on an aggregate pressure inside the PCM chamber. The aggregate pressure may be a function of each of a pressure of a coolant system that may be in heat exchange relationship with the PCM, an ambient pressure, a wall thickness/flexibility of the PCM chamber, and a void volume of the PCM chamber. Factoring in a variation of the melting temperature of the PCM based on pressure variation inside the thermal battery may provide a temperature of super-cooled or superheated PCM, which more accurately indicates a state of charge of the thermal battery.

In this way, the state of charge of a thermal battery may be accurately determined by estimating melting temperature of the PCM based on an aggregate pressure inside the thermal battery. Coolant flow through the thermal battery may be regulated based on the state of charge of the thermal battery and based on coolant temperature. In addition, pressure variations inside the battery may be minimized via control of a vent valve. The technical effect of estimating the melting temperature of the battery based on the aggregate pressure inside the battery is that pressure variations on the melting temperature may be compensated for, resulting in a more reliable estimate of the state of charge of the battery. By increasing the accuracy of a state of charge determination for the thermal battery, charging/discharging cycles of the thermal battery may be better used to regulate the temperature of a coolant in heat exchange relationship with the PCM of the thermal battery. Increasing the heating efficiency of the coolant by the thermal battery for heating various vehicle components (such as an engine, a passenger cabin, etc.) may enhance the fuel economy of the vehicle, and increase passenger comfort.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for regulating the pressure inside a thermal battery. A thermal battery may be included in a vehicle system, such as the vehicle system shown in FIG. 1A, to store excess heat produced by the vehicle system for later use. For example, the thermal energy stored by the thermal battery may be used in a thermal management system, such as the thermal management system shown in FIG. 1B, to heat various vehicle components such as a vehicle engine, cabin compartment, etc. The thermal battery may be configured with a vent valve, as described with reference to the embodiments of FIGS. 2 and 3, to enable improved pressure control. A vehicle controller may be configured to perform a control routine, such as the exam routine of FIG. 4, to regulate the pressure inside the thermal battery via adjustments to the position of a vent valve, to minimize a change in melting temperature of the PCM resulting from the pressure variation. The controller may also accurately estimate a melting temperature and a state of charge of the battery by accounting for pressure based temperature variations. As elaborated with reference to FIGS. 5-6, the controller may rely on an aggregate pressure inside the battery to measure the battery's state of charge and vary coolant flow there-through. An example operation map of the thermal battery is shown with reference to FIG. 7. In this way, thermal battery control is improved.

Figure 1A:
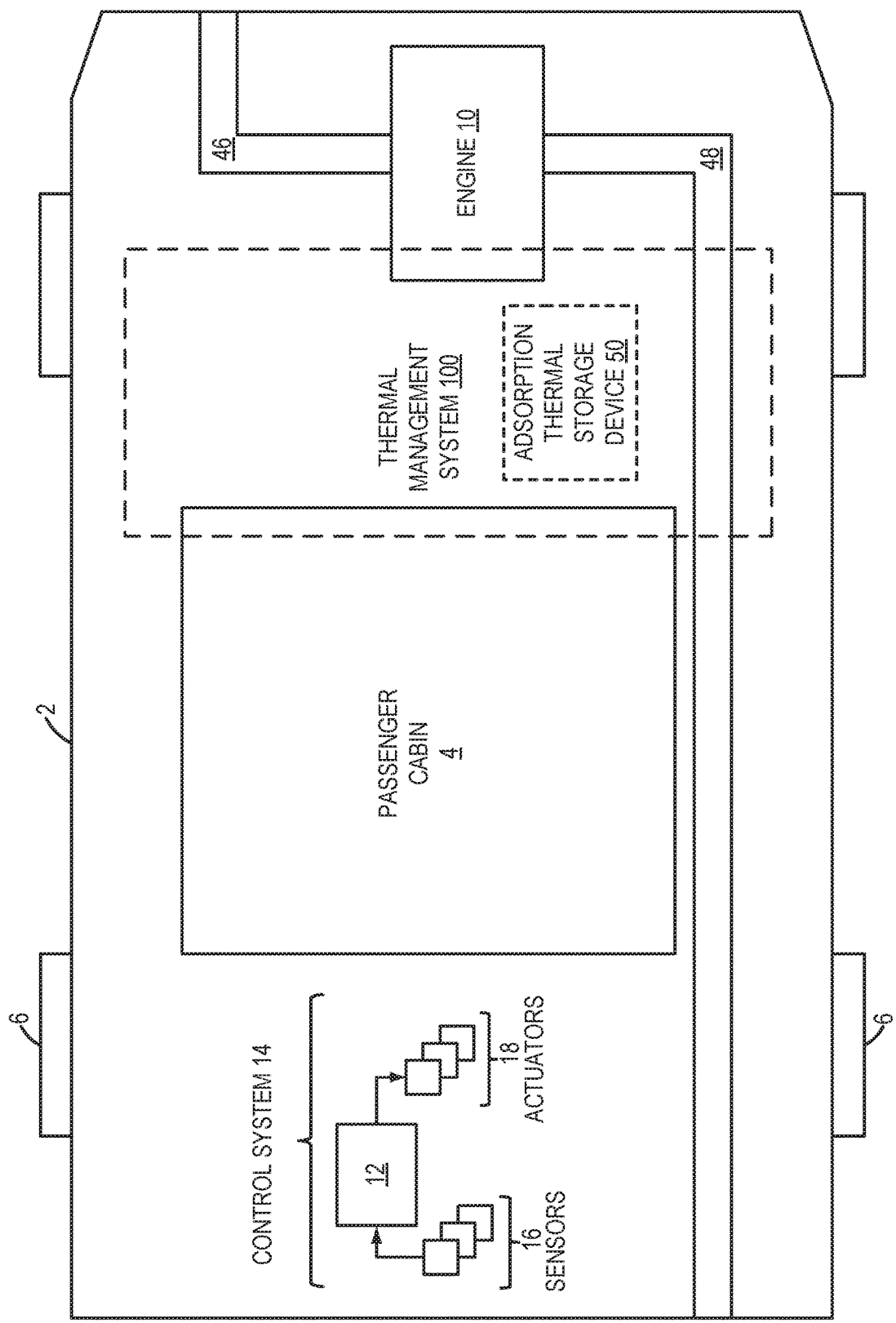
FIG. 1A shows schematic of an example vehicle system including a thermal management system.

FIG. 1A shows an example embodiment of a motor vehicle 2 including a thermal management system 100 in accordance with the present disclosure. The motor vehicle 2 includes drive wheels 6, a passenger cabin 4, and an internal combustion engine 10. The internal combustion engine 10 includes at least one combustion chamber (not shown) which may receive intake air via an intake passage 46 and may exhaust combustion gases via an exhaust passage 48. The internal combustion engine 10 may be included in the motor vehicle such as a road automobile, among other types of vehicles. In some embodiments, the internal combustion engine 10 may be included in a propulsion system that also includes a battery driven electric motor, such as in a Hybrid Electric Vehicle (HEV) or a Plug-in Hybrid Electric Vehicle (PHEV). In some embodiments, thermal management system 100 may be included in an Electric Vehicle (EV) where the internal combustion engine 10 is omitted.

Figure 1B:
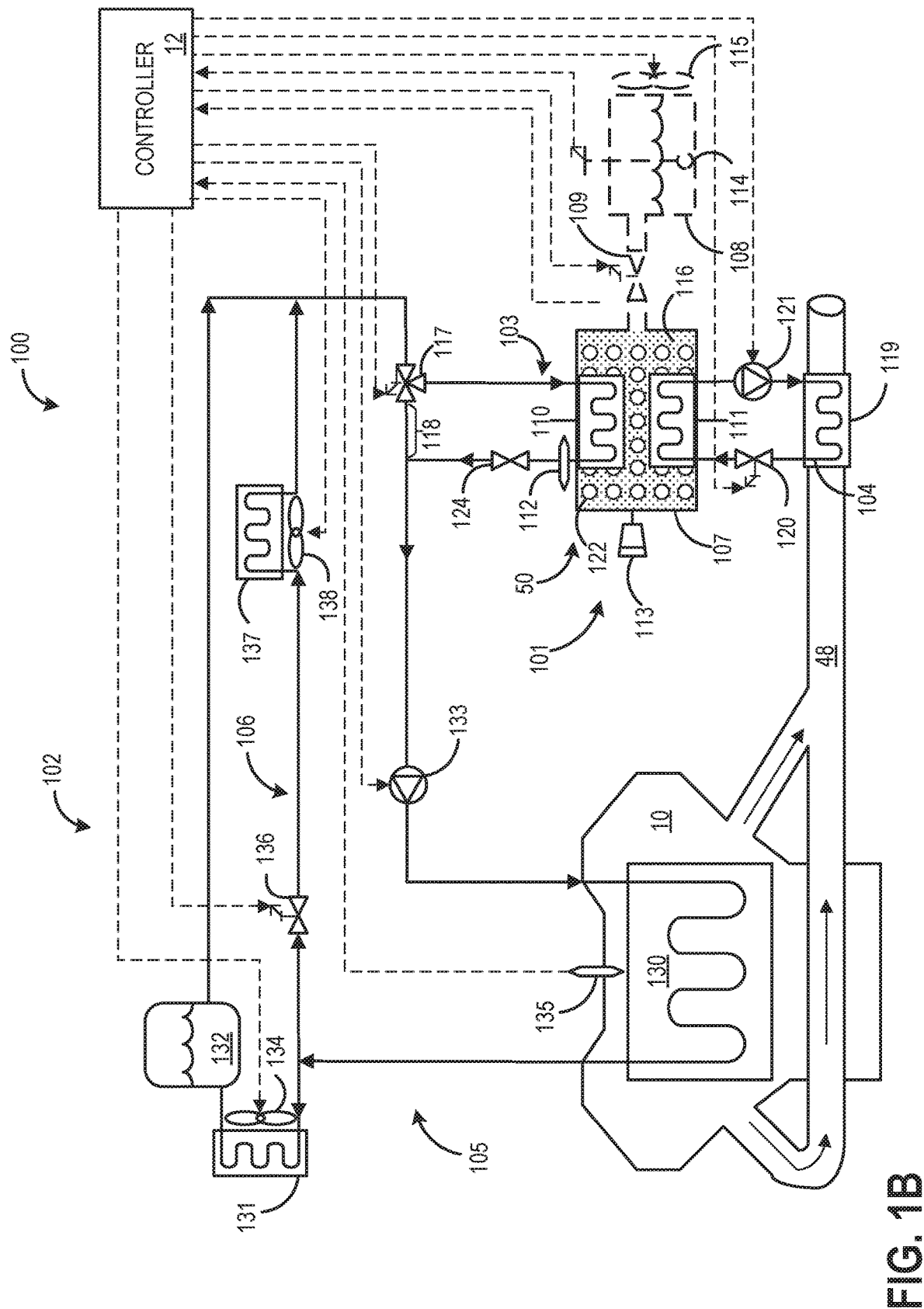
FIG. 1B shows the thermal management system of FIG. 1A, including a thermal storage device.

The thermal management system 100 may include a thermal storage device 50 or a thermal battery 50. Several embodiments of the thermal battery 50 are shown and described in detail below with reference to FIGS. 1B-3. As shown in FIGS. 1A and 1B, the thermal management system 100 may be coupled to the internal combustion engine 10, the exhaust passage 48, and the passenger cabin 4. The thermal storage device 50 may be configured to capture and store heat generated by the internal combustion engine 10 using one or more phase change materials (PCMs). Specifically, heat from exhaust gasses flowing through the exhaust passage 48 may be transferred to the thermal storage device 50, and stored for later use. Heat from the thermal storage device 50 may then be used, for example, to provide heat to the internal combustion engine 10 at a cold start, to warm the passenger cabin 4 in response to a passenger request to heat the cabin, etc. Additionally, in some examples, the thermal storage device 50 may be configured to generate heat via reversible exothermic and endothermic chemical reactions.

FIG. 1A further shows a control system 14 of the motor vehicle 2. The control system 14 may be communicatively coupled to various components of the internal combustion engine 10 and the thermal management system 100 to carry out the control routines and actions described herein. As shown in FIG. 1A, the control system 14 may include an electronic digital controller 12. The controller 12 may be a microcomputer, including a microprocessor unit, input/output ports, an electronic storage medium for executable programs and calibration values, random access memory, keep alive memory, and a data bus.

As depicted, the controller 12 may receive input from a plurality of sensors 16, which may include user inputs and/or sensors (such as transmission gear position, transmission clutch position, gas pedal input, brake input, transmission selector position, vehicle speed, engine speed, mass airflow through the engine, ambient temperature, intake air temperature, etc.), climate control system sensors (such as coolant temperature, antifreeze temperature, adsorbent temperature, fan speed, passenger compartment temperature, desired passenger compartment temperature, ambient humidity, etc.), and others.

Further, the controller 12 may communicate with various actuators 18, which may include engine actuators (such as fuel injectors, an electronically controlled intake air throttle plate, spark plugs, transmission clutches, etc.), thermal management system actuators (such as air handling vents and/or diverter valves, vent valves for regulating a pressure inside the thermal battery, valves controlling the flow of coolant, valves controlling flow of refrigerant, blower actuators, fan actuators, pump actuators, pressure regulating valves etc.), and others. In some examples, the storage medium may be programmed with computer readable data representing instructions executable by the processor for performing the methods described below as well as other variants that are anticipated but not specifically listed.

FIG. 1B depicts a schematic diagram of an example embodiment of the thermal management system 100. The thermal management system 100 comprises two circuits, a heat exchange circuit 101, and a coolant circuit 102. The heat exchange circuit 101 includes the thermal storage device 50, a coolant heat exchange loop 103, and a heat recovery loop 104. The coolant circuit 102 includes an engine circuit 105 and a heater circuit 106. Thermal energy from exhaust gasses flowing through the exhaust passage 48 may be transferred to fluid in the heat recovery loop 104. The heated fluid in the heat recovery loop 104 may then be directed through the thermal storage device 50 to warm and/or charge the thermal storage device 50. Thus, the thermal storage device may capture and/or store thermal energy obtained from hot exhaust gasses. As such, energy that would have otherwise been lost to the atmosphere may be recycled and used in the thermal management system 100.

In this way, the fuel efficiency of the system 100 may be increased. The thermal energy captured by the thermal storage device 50 may then be used to warm various vehicle components such as the internal combustion engine 10 and a heater core 137 for heating a passenger cabin (e.g., passenger cabin 4 shown in FIG. 1A). Specifically, thermal energy from the thermal storage device 50 may be transferred to various vehicle components via coolant, circulated through the thermal storage device 50. As the coolant flows through the thermal storage device 50, it is warmed, and the warmed coolant may then be pumped to the various vehicle components via the coolant circuit 102.

The heat exchange circuit 101 may employ the thermal storage device 50 to capture thermal energy from exhaust gasses flowing through the exhaust passage 48 via the heat recovery loop 104. The heat recovery loop 104 may include heat exchangers 111 and 119, a valve 120 and a pump 121. The valve 120 and the pump 121 may be controlled by signals from the controller 12. That is, the controller 12 may send signals to the valve 120 and/or the pump 121 to adjust operation thereof. Specifically, the controller 12 may adjust an opening of the valve 120 and/or a speed of the pump 121 to control an amount of fluid flowing through the heat recovery loop 104. In some examples, the valve 120 may be a continuously variable valve. However, in other examples, the valve 120 may be a binary valve. The pump 121 may be a variable speed pump. By increasing an opening of the valve 120 and/or increasing a speed of pump 121, fluid flow in the heat recovery loop 104 between the heat exchanger 111 and the heat exchanger 119 may be increased. In this way, thermal energy in the exhaust passage 48 may be transferred to fluid flowing through the heat exchanger 119. After being warmed by the exhaust gasses in the exhaust passage 48, fluid in the heat recovery loop 104 may flow through the thermal storage device 50, specifically through the heat exchanger 111, and may transfer thermal energy to the thermal storage device 50.

Thus, heat from exhaust gasses may be transferred to coolant in the coolant circuit 102 and various vehicle components, by first transferring heat from the exhaust gasses to the thermal storage device 50 via fluid circulating between the thermal storage device 50 and the exhaust passage 48. Heat in the thermal storage device 50 may then be transferred to the coolant in the coolant circuit 102 by flowing the coolant in the coolant circuit 102 through the heat exchange loop 103 positioned within the thermal storage device 50.

The heat exchange loop 103 includes a valve 117, which may be adjusted by the controller 12 to regulate an amount of coolant flowing through the thermal storage device 50 and the heat exchange loop 103. In some examples, the valve 117 may be a three way valve, where the valve may be adjusted to a first position, where substantially no coolant flows through the heat exchange loop 103, and may instead flow through a coolant line 118 directly towards the pump 133 without flowing through thermal storage device 50. The valve 117 may be further adjusted to a second position where substantially all of the coolant in the coolant circuit 102 flows through the heat exchange loop 103 and the thermal storage device 50, and substantially no coolant flows through the coolant line 118. In some examples, the valve 117 may be a continuously variable valve and may be adjusted to any position between the first position and the second position.

By adjusting the valve 117 between the first position and the second position, an amount of coolant flowing through the thermal storage device 50 may be adjusted. Specifically, the amount of coolant flowing through the heat exchange loop 103 relative to the coolant line 118 may be increased by adjusting the valve 117 towards the second position, and away from the first position. In response to a demand for increased coolant temperature, such as during an engine cold start, the controller 12 may send signals to the valve 117 to adjust towards the second position, to increase the amount of coolant flowing through the thermal storage device 50. As such, a temperature of the coolant may be increased by flowing the coolant through the thermal storage device 50. In this way, the thermal storage device 50 may provide an additional source of heat for the coolant, when desired.

In some examples, the heat exchange loop 103 may additionally include a valve 124, which may regulate an amount of coolant flowing out of the thermal storage device 50, and back to the coolant circuit 102. Thus, the valve 124 may be adjusted to a closed first position where substantially no coolant flow there-through, and thus, coolant flow through the thermal storage device 50 and the heat exchange loop 103 stops. Additionally, the valve 124 may be adjusted to a fully open second position, where coolant flows therethrough. In some examples, the valve 124 may be a continuously variable valve and may be adjusted to any position between the first and second positions, to regulate an amount of coolant exiting the valve 124. Specifically, the controller 12 may send signals to the valve 124 to adjust the position of the valve. The amount of coolant flowing through the valve 124 may increase as an opening formed by the valve 124 increases with increasing deflection of the valve 124 towards the open second position and away from the closed first position.

After exiting the thermal storage device 50, coolant may be directed towards a pump 133 due to the suction generated at an inlet of the pump 133. Thus, coolant may be pumped from one or more of the coolant line 118 and the heat exchange loop 103 to various vehicle components such as the internal combustion engine 10, by the pump 133. More simply, the pump 133 may circulate coolant through the coolant circuit 102.

It may also be appreciated that in some examples, coolant in the coolant circuit 102 may not be routed through the thermal storage device 50, and that a separate fluid flowing loop may be included in the thermal management system 100 to capture heat stored in the thermal storage device 50. In such examples, a separate heat exchange loop, such as the heat recovery loop 104 may be used to transfer heat from the thermal storage device 50 to the coolant in the coolant circuit 102. Thus, fluid flowing through this separate heat exchange loop may be routed through the thermal storage device 50 to capture heat from the thermal storage device 50. An additional pump may be included in the heat exchange loop to pump the fluid through the thermal storage device 50. The fluid in this loop may then transfer heat from the thermal storage device 50 to coolant in the coolant circuit 102 via a heat exchanger, such as the heat exchanger 119. As such, coolant in the coolant circuit 102 may not pass through the thermal storage device 50, and may instead pass through a heat exchanger, where heat captured from the thermal storage device 50 by a fluid flowing in a separate heat exchange loop may be transferred to the coolant.

A temperature sensor 112 may be coupled to the heat exchange loop 103 for estimating a temperature of the thermal storage device 50. Specifically, the temperature sensor 112 may be coupled at a coolant outlet of the thermal storage device 50 where coolant leaves the thermal storage device 50. Thus, the temperature sensor 112 may be configured to measure a temperature of the coolant in heat exchange loop 103 as it exits the thermal storage device 50. Based on signals received from the temperature sensor 112, the controller 12 may infer a state of charge of the thermal storage device 50. However, in other examples, the temperature sensor 112 may be coupled directly to the thermal storage device 50 for measuring a temperature thereof. The state of charge of the thermal storage device 50 may be proportional to the temperature of the device 50. That is, the state of charge may increase with increasing temperatures of the device 50.

The thermal storage device 50 may include a housing 107. Various insulating materials may be included within the housing 107 to maintain the temperature of the thermal storage device 50. Further, the thermal storage device 50 includes a phase change material (PCM) 116. In some examples, two distinct PCMs with different melting temperatures may combined to form a mixture in the thermal storage device 50. However, in other examples, one PCM may be present inside the thermal battery.

In some embodiments, as depicted in FIG. 1B, the thermal storage device 50 may additionally be configured to generate thermal energy through chemical adsorption. In such examples, where the thermal storage device is capable of generating thermal energy, the thermal energy device 50 may include a plurality of adsorber cells 122, which may be filled with an adsorbent. The adsorbent may be a high-energy medium density such as silica gel, zeolite, activated carbon, or other suitable adsorbents. The adsorbent may be formed into a crystalline structure within the plurality of adsorber cells 122. Additionally, the thermal storage device 50 may include a fluid container 108, fluidically coupled to the plurality of adsorber cells 122 via an electronic throttling valve 109. The electronic throttling valve 109 may be opened or closed in response to signals from the controller 12. The fluid container 108 may contain an adsorbate that results in an exothermic reaction when combined with the adsorbent in the plurality of adsorber cells 122. For example, in embodiments where the adsorber cells contains an adsorber such as zeolite, the fluid in fluid container 108 may be water, or an aqueous solution, such as ethylene glycol solution or propylene glycol solution. The fluid may also be a methanol or ammonia based solution. Upon opening of the electronic throttling valve 109, fluid from the fluid container 108 may enter the housing 107, where the fluid may be adsorbed by the adsorbent. The fluid container 108 may further include a fluid level sensor 114, and may be coupled to a fan 115.

The thermal storage device 50 may further include a pressure relief valve 113, herein also referred to as a vent valve. In one example, the pressure relief valve 113 may fluidically connect the PCM inside the housing 107 to ambient. In another example, the pressure relief valve may connect the housing 107 to the coolant system. In some examples, more than one pressure relief valve may be present, wherein each of the pressure relief valves may fluidically connect the thermal storage device 50 either to ambient, or to the coolant system. In an example, the pressure relief valve may be a continuously variable valve and may be adjusted to any position between a first (fully closed) and a second position (fully open), to regulate pressure release from the thermal battery. The pressure relief valve 113 may be an electrically actuated valve, or a thermally actuated valve. A detailed embodiment of the housing of the thermal storage device with the pressure relief valve is shown with reference to FIGS. 2-3.

From the coolant line 118 and/or the heat exchange loop 103, coolant may be pumped by the pump 133 to one or more vehicle components such as the internal combustion engine 10. The pump 133 may be controlled by signals from controller 12. Thus, the controller 12 may send signals to the pump 133 to adjust a speed of the pump 133, and therefore an amount of coolant flowing through the coolant circuit 102. Specifically, the pump 133 in some examples may be a variable speed pump.

As depicted in the example of FIG. 1B, coolant may be pumped from one or more of the coolant line 118 and/or the heat exchange loop 103 to the engine circuit 105. However, it may be appreciated that in other examples, coolant may be pumped to the engine circuit 105 before being pumped to the heat exchange loop 103. It may also be appreciated, that in some examples, coolant may be pumped directly from the thermal storage device 50 to various vehicle components such as the heater core 137, and may bypass the internal combustion engine 10. Thus, coolant warmed by the thermal storage device 50 may be routed directly to a vehicle component, such as a passenger cabin (e.g., passenger cabin 4 shown in FIG. 1A), to warm the vehicle component.

The engine circuit 105 includes an engine cooling jacket 130, a radiator 131, and a coolant reservoir 132. A radiator fan 134 may be coupled to the radiator 131. A temperature sensor may be coupled to the internal combustion engine 10 or to the engine cooling jacket 130, such as a thermocouple 135. In a scenario when the engine is cold (e.g., cold-start conditions), heat stored in the thermal storage device 50 may be transferred to coolant engine circuit 105 via the heat exchanger 110 through activation of the pump 133 and the adjusting of the valve 117 to the second position. If the engine is overheated, coolant may be circulated by the pump 133 through the engine cooling jacket 130, with excess heat discharged through the radiator 131 with the use of the radiator fan 134. In such examples, it may not be desired to warm the coolant in the coolant circuit 102, and as such, the valve 117 may be adjusted to the first position and thus, coolant may bypass the thermal storage device 50. Heat from the internal combustion engine 10 may also be used to charge and/or heat the thermal storage device 50 through activation of pump 121 and the opening of the valve 120. In another example, excess heat available in the engine coolant system may be transferred through the heat exchanger 110 to the thermal storage device 50 when the state of charge of the thermal storage device is less than desired, and when there is a temperature difference between the engine coolant system and the thermal storage device 50 to drive the heat flow to the thermal storage device.

The heater circuit 106 includes a valve 136 and the heater core 137. A fan 138 may be coupled to the heater core 137. A passenger may request heat for the passenger cabin 4. In response to this request, the controller 12 may signal the valve 136 to open, thereby partially bypassing the engine circuit 105. Coolant in the engine circuit 105 may be circulated through the heater circuit 106 by activating the pump 133. Heat from the coolant may then be transferred to the heater core 137 and blown into the passenger cabin 4 by activating fan 138. If the coolant in the engine circuit 105 is insufficient to charge the heater core 137, additional heat may be passed to the coolant circuit 102 by adjusting the valve 117 to the second position, and flowing coolant through the thermal storage device 50. More detailed methods for usage and control of the thermal management system 100 are discussed below and with reference to FIGS. 4-6.

Figure 2:
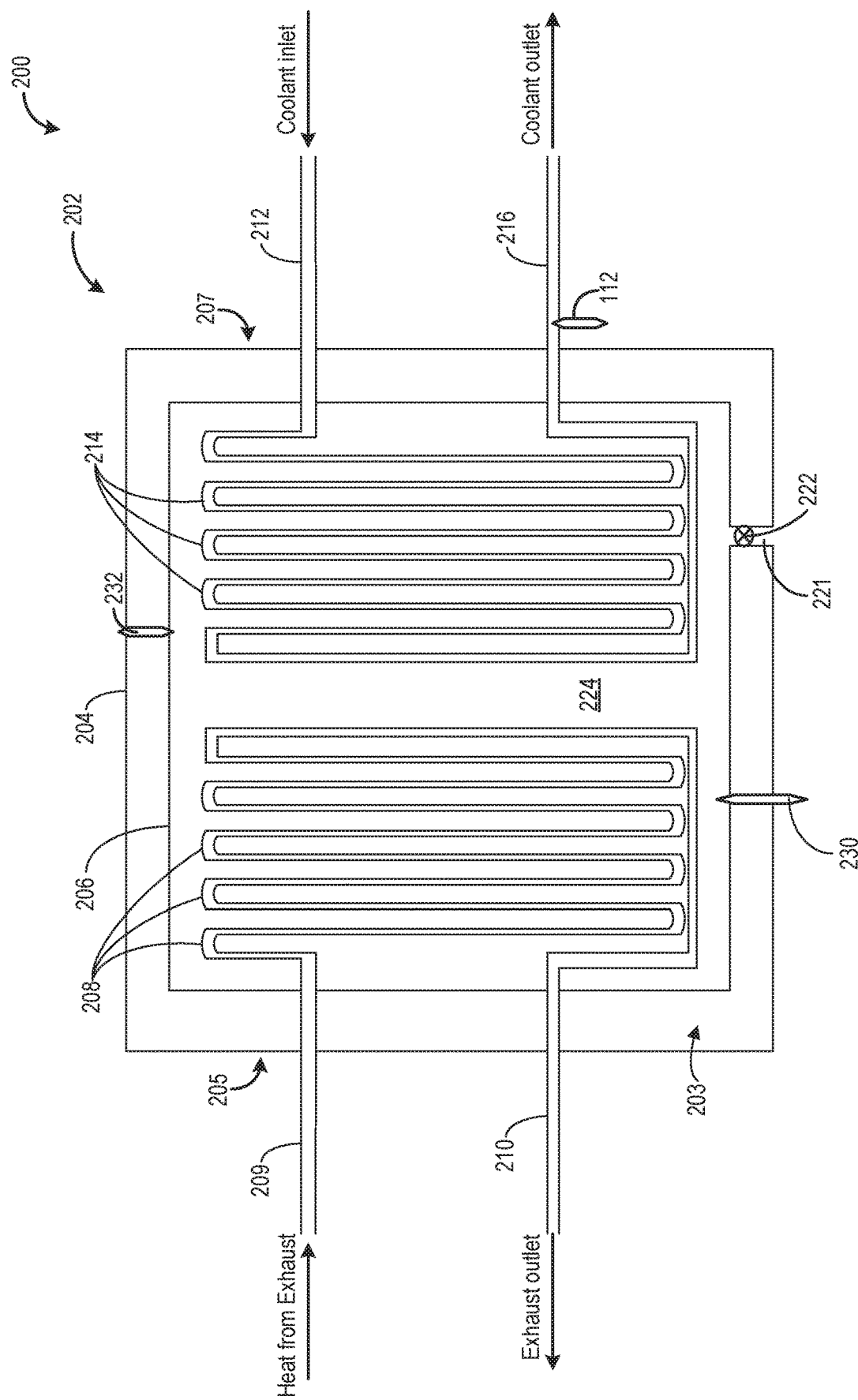
FIG. 2 shows a first example embodiment of a thermal storage device including a vent valve for pressure control.
Figure 3:
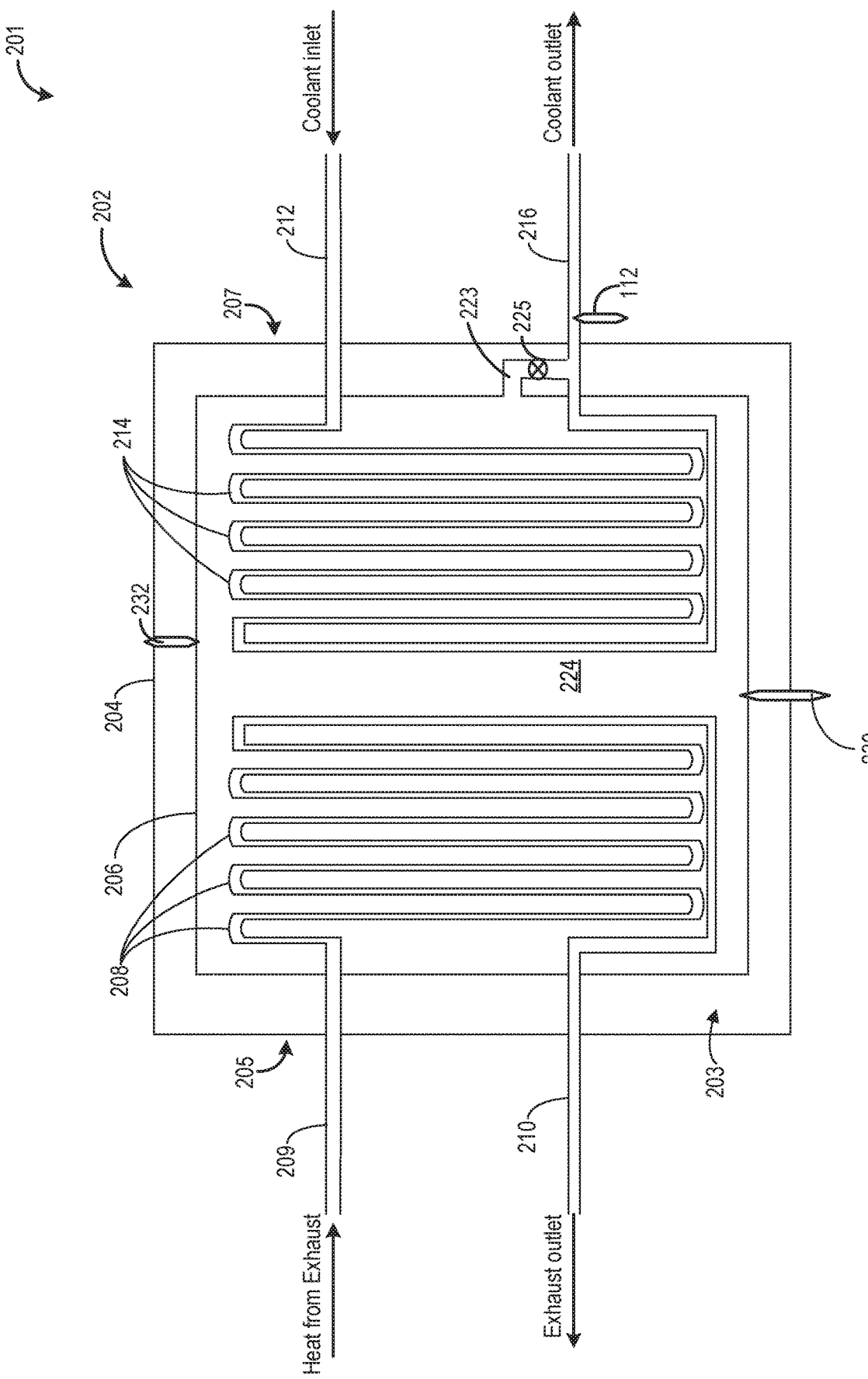
FIG. 3 shows a second example embodiment of a thermal storage device including a vent valve for pressure control.

FIGS. 2 and 3 show example embodiments of a thermal battery 202 that may be included in a vehicle system (e.g., the motor vehicle 2 shown in FIG. 1A). In one example, thermal battery 202 shown in FIGS. 2 and 3 is the same as thermal storage device 50 described above with reference to FIG. 1B. FIGS. 2 and 3 are described together, and components introduced in the description of FIG. 2 are not reintroduced or described again at FIG. 3. The thermal battery of FIGS. 2-3 includes a vent valve for venting pressure from the thermal battery to a coolant circulating there-through, or to ambient air. In one example, the vent valve of FIGS. 2-3 includes pressure relief valve 113 of FIG. 1.

The thermal battery 202 may be included in the vehicle system to store heat produced by an engine (e.g., the internal combustion engine 10 shown in FIGS. 1A and 1B) of the vehicle system for later use. Specifically, heat from the thermal battery 202 may be transferred to coolant of a coolant system (e.g., the coolant circuit 102 shown in FIG. 1B) by flowing the coolant through the thermal battery 202. When the temperature of the coolant is less than the temperature of the thermal battery 202, heat may be transferred from the thermal battery 202 to the coolant flowing through the thermal battery 202, draining, or discharging the thermal battery 202. In the description herein, draining or discharging the battery may refer to the removal of heat or thermal energy from the thermal battery 202. Similarly, charging the thermal battery may refer to an increase of thermal energy of the thermal battery 202. To charge the thermal battery 202, excess heat produced by the vehicle system, such as from the engine, may be transferred to the thermal battery 202, as explained above with reference to FIG. 1B.

Focusing on FIG. 2, it shows a schematic depiction of a first embodiment 200 of the thermal battery 202. The thermal battery 202 may comprise a housing 204 within which components of the thermal battery 202 may be included. A heat exchange chamber 206 is included within the housing 204, and may include a PCM 224. In one example, the PCM 224 may be a mixture of two or more PCMs, each PCM with a different melting temperature. Alternatively, the PCM 224 may include a single PCM. In embodiments where multiple PCMs are included, relative amounts of the different PCMs may be same. In other examples, the relative amount of the two or more PCMs may be varied based on their individual physical and chemical properties.

One or more insulating layers, such as an insulating layer 203, may be included between the housing 204 and the heat exchange chamber 206 to reduce heat transfer between the interior and exterior portions of the housing 204 and battery 202. The insulating layer may include a suitable insulating material which fills the entirety of the insulating layer. In this way, the insulating layer 203 may reduce heat loss/gain at the thermal battery 202 to/from the external environment. Although one insulating layer is shown in FIGS. 2 and 3, it may be appreciated that more than one layer may be included. In some examples, each insulating layer may be constructed from distinct insulating materials.

Heat from exhaust gasses flowing in an exhaust passage (e.g., the exhaust passage 48 shown in FIGS. 1A and 1B) may be introduced to the thermal battery 202 via a heat source inlet tube 209. In some examples, as described above with reference to FIG. 1B, the heat from exhaust gasses may be transferred to the thermal battery 202 via a heat exchange fluid wherein a fluid at a higher temperature than the thermal battery 202 may circulate through the thermal battery 202 entering via heat source inlet tube 209 and exiting via exhaust outlet 210. As a result of the circulation of the heated fluid, thermal energy (e.g., heat) is transferred to the thermal battery 202. However, it may be appreciated that in other examples, exhaust gasses may be directly routed through the thermal battery 202 via the heat source inlet tube 209 and exhaust outlet 210. After flowing through the heat source inlet tube 209, the heat exchange fluid (which may be a liquid or a gas) may flow through a series of heat exchange tubes 208 positioned within the heat exchange chamber 206, to increase the surface area of heat transfer from the fluid to the PCM 224 in the heat exchange chamber 206. In an alternate example, the heat absorption tubes 214 may be positioned around the heat exchange chamber 206 containing the PCM 224, instead of within the heat exchange chamber. In such a configuration, the heat absorption tubes 214 may be positioned around a perimeter of the heat exchange chamber 206, between the heat exchange chamber 206 and insulating layer 203. During conditions when the fluid is at a higher temperature than the PCM 224, the PCM 224 may absorb heat from the fluid flowing through the heat exchange tubes 208. Thus, the heat source inlet tube 209 and the heat source outlet tube 210 may provide fluidic communication between exterior portions of the battery 202 and the heat exchange chamber 206.

Coolant from a vehicle coolant system may also enter the thermal battery 202 via a coolant inlet tube 212. After entering through the coolant inlet tube 212, coolant may flow through heat absorption tubes 214 positioned within the heat exchange chamber 206, where heat from the PCM 224 in the heat exchange chamber 206 may be transferred to the coolant.

During conditions when the coolant is at a lower temperature than the PCMs, the coolant may absorb heat from the PCM 224. Coolant in the heat absorption tubes 214 may then exit the thermal battery 202 via a coolant outlet tube 216. Thus, the coolant inlet tube 212 and the coolant outlet tube 216 may also provide fluidic communication between exterior portions of the battery 202 and the heat exchange chamber 206.

Although the heat source inlet tube 209 and the heat source outlet tube 210 are shown in FIGS. 2 and 3 to be positioned at and extending through the same side of the thermal battery 202, it may be appreciated that in other examples, the heat source inlet tube 209 and the heat source outlet tube 210 may be positioned on different sides of the battery 202. For example, the heat source inlet tube 209 may be positioned at and may extend through a front end 205 of the thermal battery 202, and the heat source outlet tube 210 may be positioned at and extend through a back end 207.

Similarly, the coolant inlet tube 212 and the coolant outlet tube 216 although shown in FIGS. 2 and 3 to be positioned and extending through the same side of the thermal battery 202, may in other examples be positioned on different sides of the battery 202. For example, the coolant inlet tube 212 may be positioned at and may extend through the front end 205 and the heat source outlet tube 216 may be positioned at and may extend through the back end 207.

A passage 221 passing through the insulating layer 203 may fluidically connect the heat exchange chamber 206 to atmosphere outside the thermal battery 202, as illustrated in FIG. 2. A vent valve 222 positioned in the passage 221 may be configured to release pressure from inside the heat exchange chamber 206 to atmosphere when actuated. The pressure inside the heat exchange chamber may be measured via a dedicated pressure sensor, or estimated based on operating conditions. In one example, the vent valve 222 may be opened to allow fluid or air back into the thermal battery when the pressure inside the thermal battery decreases more than desired.

In the embodiment 201 of the thermal battery illustrated in FIG. 3, an additional passage 223 fluidically connects the heat exchange chamber 206 to the coolant system at the coolant outlet tube 216. In the depicted example, passage 223 traverses through the insulating layer 203 to fluidically connect heat exchanger chamber 206 to the coolant outlet tube 216. In other examples, the passage 223 may fluidically connect the heat exchange chamber 206 to other parts of the coolant system, for example, to the heat absorption tubes 214. In such an embodiment, a vent valve 225 may be positioned along the passage 223 to regulate pressure inside the heat exchange chamber 206 by releasing pressure from the heat exchange chamber 206 to the coolant system.

In one example, more than one vent valve may be present in the thermal battery 202. Each thermal vent valve may connect either to atmosphere or to the coolant system to vent pressure from the heat exchange chamber 206.

In one example, the vent valve 222 illustrated in FIG. 2 and the vent valve 225 illustrated in FIG. 3 may be electrically actuated valves. In another example, the vent valves may be operated by a thermally activated actuator, wherein a change in temperature may cause expansion or contraction of a wax element of the vent valve, which may bias a spring element of the valve to open or close the vent valve. In still others examples, the vent valves may be actuated in response to pressure change and/or temperature change adjacent to the vent valve. The vent valves may be adjusted to a fully open first position and to a fully closed second position. In some example, the vent valves may be continuously variable valves and may be adjusted to any position between the first position and the second position. A position of the vent valve 222 may be controlled by a controller. For example, controller 12 illustrated in FIG. 1A may regulate opening and closing of the vent valve based on aggregate pressure inside the heat exchange chamber, as will be discussed below with reference to FIGS. 4-8.

Alternate embodiments of the thermal battery may include a plurality of heat exchanger chambers, such as a first heat exchange chamber and a second heat exchange chamber within the housing 204 of the thermal battery. Therein each heat exchanger chamber may have the above-described configuration with heat absorption tubes running through it, and a dedicated vent valve coupled to each chamber for venting to either ambient or to the coolant system. In some examples, each of the first and the second heat exchange chamber may contain two or more PCMs combined to form a mixture. Further, the mixture of PCMs in the first heat exchange chamber may be different from the mixture of PCMs in a second chamber of the thermal battery, although in other examples, the mixture of PCMs may be the same in each chamber of the thermal battery.

In examples where the PCMs are separated from one another into distinct chambers, energy may not transfer immediately between the chambers and a state of thermal equilibrium between the two chambers may depend on temperature inside each chamber and on the rates of conduction and/or convection between the two chambers of the thermal battery. Each heat exchange chamber may include a heat source inlet and a heat source outlet for heating the respective heat exchange chamber. Additionally, each heat exchange chamber may include a coolant flow system for extracting heat from the PCM in each of the heat exchange chambers.

As such, by changing the temperature of the PCM, relative to a melting temperature of the PCM, a state of charge of the thermal battery may be varied. Thus, the thermal battery may be heated and charged by flowing heated fluid (or exhaust gas) through the heat exchange tubes. Further, the thermal battery may be cooled and discharged by flowing coolant through the heat absorption tubes. Concurrently, pressure inside the thermal battery may be released through the vent valve to ambient or to the coolant system.

In the description herein the phase change temperature may refer to the temperature at which a material changes phases, such as between a liquid phase and a solid phase, between a liquid phase and a gaseous phase, and/or in some examples, between a solid phase and a gaseous phase. The temperature at which a material changes between a liquid and a gas may be referred to as the vaporization phase change temperature, and the temperature at which a material changes between a liquid and a solid may be referred to as the melting temperature.

In one example, when the PCM 224 includes a mixture of PCMS, each PCM may have a distinct (non-overlapping) phase temperature and a melting temperature of the battery may be determined as a function of the phase temperature of the individual PCMs as well as their relative ratio in the PCM mixture. As an example, where a PCM includes a mixture of a first PCM and a second PCM, a phase change temperature of the first PCM may be different by 5° F. from a phase change temperature of the second PCM. Consequently, the first PCM may change phase between a solid and a liquid at a different temperature and/or range of temperatures than the second PCM.

The PCM 224 may comprise any suitable phase change materials. For example, the PCM may comprise any one or more of paraffin wax blends, water, bath metals, plain thermals, etc. Further, the concentration of the PCM may be varied throughout the heat exchange chamber 206. For example, the concentration of the PCM may increase radially outwards from a center of the battery 202. In other examples, the concentration of the PCM may decrease radially outwards from the center of the battery 202. However, other patterns or concentration distributions of the PCM may be utilized, such as Gaussian. Further, the concentration distributions of the two or more PCMs may be different and/or independent of one another. In other examples, the concentration distributions of the two or more PCMs may be approximately the same.

In addition to varying based on the ratio of PCMs in the thermal battery, as well as the physical and chemical properties of the constituent PCMs, the phase change temperature of a given PCM may further vary depending on pressure conditions at the thermal battery 202. As a non-limiting example, the pressure at the thermal battery may be a function of the ambient pressure experienced at the thermal battery. The phase change temperature of the PCM may decrease as altitude increases, and ambient pressure decreases. In further examples, the phase change temperatures of the constituent PCMs may depend on each of a concentration of glycol in the PCMs, a pressure of the coolant system in contact with the PCM, a void volume around the heat exchange chamber, a flexibility of the heat exchange chamber, and the percentage of PCM in a solid state (relative to a liquid state). In particular, the melting temperature of a given PCM increases with pressure.

The thermal energy is stored in each PCM as latent heat (no change in temperature happens during latent heat storage) and as sensible heat (reflected by a change in temperature), wherein the majority of the heat is stored as latent heat. Blending multiple PCMs may result in an almost continuous curve showing relationship of state of charge and temperature. Additionally, the blending of multiple PCMs, each PCM with a specific melting temperature, may result in a range of melting temperature rather than a fixed melting temperature value. The state of charge relationship to temperature can begin to look like a continuous curve as the temperature changes. By including two or more PCMs with different phase change temperatures in a thermal battery, a measurable temperature of the thermal battery 202 may be made continuous over the differing charge states of the thermal battery 202. That is, there may be a distinct measurable temperature for every different state of charge of the battery 202. A given measurable temperature of the battery 202 may then correspond to a specific state of charge of the battery 202.

However, it is important to note that the state of charge of the battery 202 may be additionally determined based on whether the battery is charging or discharging, a rate of change in the temperature of the battery 202, a coolant temperature of coolant flowing through the battery, a pressure of the coolant system, ambient pressure, pressure inside the thermal battery etc., as explained in greater detail with reference to FIGS. 4-7.

In one example, pressure variation and melting temperature variation of the PCM of the thermal battery may be seen when the thermal battery is fully charged, wherein the temperature of the PCM is 110° C. and the melting temperature of the PCM at 35 Psi pressure is 100° C. The PCM at 110° C. therefore has trapped latent heat as well as 10° C. of sensible heat. As the thermal battery cools down, it loses the sensible heat and the latent heat to be at the temperature 100° C. At this point if the pressure changes inside the thermal battery from 35 Psi to 14.7 (for example, due to decrease in ambient pressure with an altitude change), the steady state melting temperature of the PCM may decrease to 90° C. However, the PCM continues to be at 100° C. and hence still has the same amount of latent heat and sensible heat trapped for transferring to the coolant (same state of charge), even though the temperature at which energy transfer may happen is lower (heat transfer is at the reduced temperature of 100° C. of the PCM and not at 110° C.). Thus, the state of charge of the battery depends on the pressure-adjusted melting temperature of the PCM.

In another example, the thermal battery may be fully discharged (e.g., with the PCM fully crystalline/solid) at 14.7 Psi. The temperature of the PCM may be 80° C. while the melting temperature of the PCM is 90° C. As the battery is heated by flowing a heat source fluid at 95° C. through the thermal battery, the PCM warms up to reach the melting temperature of 90° C. and may start trapping latent heat to become superheated (where the PCM changes from solid to liquid phase). At this point, if the pressure suddenly rises to 35 Psi, the melting temperature of the PCM may also increase from 90° C. to 100° C., while the PCM is still at 90° C. The PCM which was superheated at 90° C. previously, is now supercooled at 90° C. (no latent heat trapped in the PCM, the PCM in solid state again) due to the change in melting temperature of the PCM. Thus, at a measured temperature of the PCM, the state of charge of the thermal battery may be determined by the melting temperature of the PCM at a specific pressure inside the thermal battery.

For a given PCM, the supercooled temperature, and superheated temperature may each be equal the melting temperature wherein all the latent heat is stored in the PCM while it continues to be at the melting temperature. However, when two or more PCMs are present, wherein each PCM has a different melting temperature, there will not be a single melting temperature for all of the PCMs, and therefore the values at which each of the PCM is fully superheated or supercooled will be different. In other words, the superheated temperature may represent the temperature at which all of the PCMs are melted (e.g., the highest melting temperature for all the PCMs) while the supercooled temperature may represent the temperature at which all of the PCMs are solidified (e.g., the lowest melting temperature for all the PCMs). Based on the supercooled temperature and the superheated temperature, the state of the charge may be determined, as will be discussed below.

In some examples, the thermal battery 202 may include a temperature sensor 230 and a pressure sensor 232 that may be configured to measure a temperature and a pressure, respectively, inside the heat exchange chamber 206. In embodiments of the thermal battery with two or more chambers, each chamber may include a dedicated temperature sensor and/or a pressure sensor. The temperature sensor 230 and the pressure sensor 232 may be electrically coupled to a controller (e.g., the controller 12 shown in FIGS. 1A and 1B), for communicating a measured temperature of the PCM and a measured pressure of the heat exchange chamber to the controller.

Thus in some examples, the controller may estimate a state of charge of the battery 202 based on a temperature of the PCM and further based on the pressure inside the thermal battery, as will be discussed below with reference to FIGS. 5-7.

FIGS. 2-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, the systems of FIGS. 1A-3 enable a vehicle system comprising an engine including a coolant circuit; a thermal storage device including a first phase change material having a first phase change temperature, a second phase change material having a second, different phase change temperature; and a vent valve coupling the device to atmosphere; a coolant valve coupling the thermal storage device to the engine coolant circuit; a temperature sensor for estimating a temperature of the device; a first pressure sensor for estimating a pressure inside the device; a second pressure sensor for estimating an ambient pressure outside the device; and a controller. The controller may be configured with non-transitory computer readable instructions for: estimating a melting temperature of the device based on inputs from each of the temperature sensor, the first pressure sensor, and the second pressure sensor; inferring a state of charge of the device based on the estimated melting temperature; and adjusting a position of the coolant valve based on each of the state of charge of the device and a demand for coolant heating.

Figure 4:
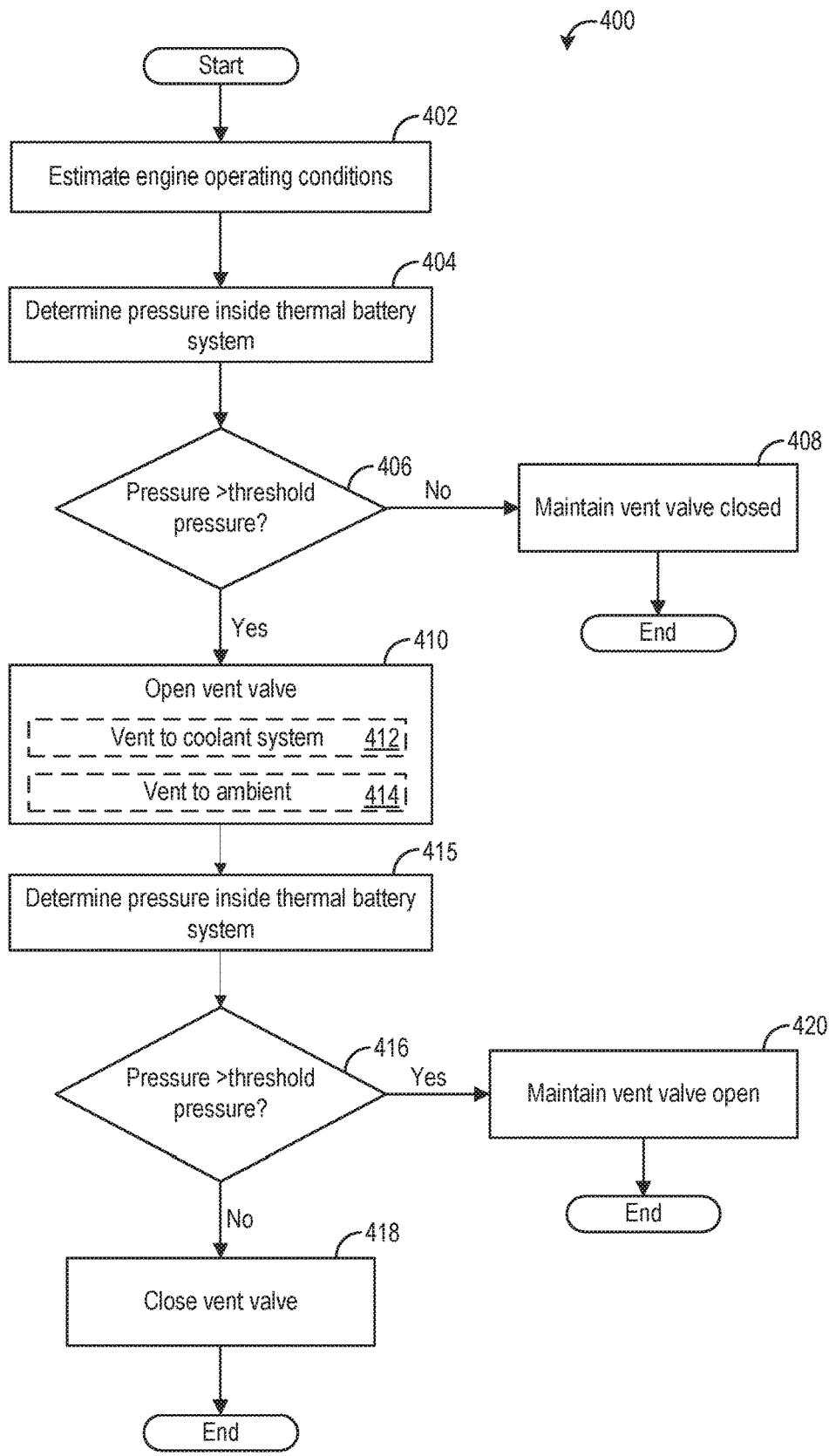
FIG. 4 illustrates an example method for regulating a pressure inside a thermal storage device via control of a vent valve.

Continuing to FIG. 4, it shows an example method 400 for regulating a pressure inside a thermal battery (e.g., the thermal storage device 50 shown in FIGS. 1A and 1B, and the thermal battery 202 shown in FIGS. 2 and 3) via actuation of a vent valve (such as valve 222 and 225 of FIGS. 2-3). The pressure inside the thermal battery may be maintained within a specific range to minimize variation in a melting temperature of a PCM (for example, the PCM 224 in FIGS. 2 and 3) inside the heat exchange area of the thermal battery. The method 400 described below may be used for regulating pressure of the thermal battery including one or more than one heat exchange chambers. Each of the heat exchange chamber may include one PCM, or a mixture of two or more PCMs, as discussed above with reference to FIGS. 2 and 3.

As explained above with reference to FIGS. 1-3, the thermal battery may include a vent valve for venting the pressure from inside of the heat exchange area to ambient and/or to the coolant system. A position of the vent valve may be regulated by a controller, such as the controller 12, based on input from pressure sensor/s coupled to the thermal battery, for example, the pressure sensor 232 illustrated in FIGS. 2 and 3. Eliminating pressure variation with in the thermal battery by regulating the position of the vent valve minimizes variation of melting temperature of the PCM, which enables an accurate determination of a state of charge of a battery. As will be described further with reference to FIGS. 6 and 7, based on the state of charge of the thermal battery, battery charging, and coolant heating may be regulated.

Instructions for carrying out method 400 and the rest of the methods included herein may be executed by a controller, for example, the controller 12, based on instructions stored on a memory of the controller and in conjunction with signals received from sensors of the engine system, including temperature sensors, pressure sensors, etc., described above with reference to FIG. 1A. The controller may employ actuators of the engine system to adjust a position of the vent valve for releasing pressure from inside of the thermal battery, according to the methods described below. In one example, based on input from the pressure sensor 232 of FIG. 2 being over a threshold pressure, the controller 12 may send a signal to an actuator to open the vent valve 220 of the thermal battery 202, thereby releasing the pressure to atmosphere outside the thermal battery.

The method 400 begins at 402, which comprises estimating and/or measuring engine operating conditions. Engine operating conditions may include driver demand, engine speed, engine temperature, ambient conditions including ambient temperature and pressure, engine coolant temperature and coolant mass flow through a cylinder head, a temperature of the thermal battery, a state of charge of the thermal battery, exhaust gas temperature, a speed of the heat source pump, etc.

After estimating and/or measuring engine operating conditions at 402, method 400 may proceed to 404, which includes estimating a pressure inside the thermal battery. In one example, the pressure inside the thermal battery may be measured by the pressure sensor 232 coupled to the heat exchange chamber 206 containing the PCM 224, as illustrated in FIGS. 2 and 3. As another example, the pressure inside the thermal battery may be inferred or modeled based on ambient conditions (e.g., based on ambient pressure) and further based on the physical and chemical properties of the PCM(s) inside the thermal battery.

The method 400 may then continue to 406 wherein it is assessed if the pressure inside the thermal battery is more than a threshold pressure. The threshold pressure may be a pressure at or above which the melting temperature of one or more PCMs inside the thermal battery may change by a large enough degree to alter the amount of latent heat trapped in the PCM.

The threshold pressure may in turn depend on the make of the thermal battery, including the void volume inside the thermal battery, flexibility/expansion of walls of a chamber containing the PCM, correlation between the melting temperature and pressure variation of each of the PCMs inside the thermal battery etc. Certain amount of pressure increase may be dissipated by the thermal battery based on the make of the thermal battery without altering the melting temperature of the PCM. However, after a certain amount of pressure increase, the melting temperature of the PCM inside the thermal battery may be altered based on the correlation of the melting temperature of the PCM and pressure variation.

An increase in the melting temperature of the PCM is inversely proportional to the state of charge of the battery at a given temperature of the PCM. In one example, when two PCMs are present inside the thermal battery, the melting temperature of each of the PCMs may change by the same degree or by a different degree with a given change in pressure inside the thermal battery. A change in the melting temperature of the PCMs due to a change in pressure may change the amount of latent heat that may be present in the PCMs, thereby altering the state of charge of the battery.

If the pressure is not more than the threshold pressure, the method 400 proceeds to 408, wherein the controller maintains the vent valve of the thermal battery in a closed position. As such, the closed position may be default position of the vent valve. Herein, based on a pressure signal received from a pressure sensor coupled to the thermal battery, the controller sends a signal to maintain the vent valve at the closed position as no venting of pressure is required. The method 400 then ends.

However, at 406, if the pressure is more than the threshold pressure, the method 400 proceeds to 410, wherein the controller sends a signal to a valve actuator to open the vent valve to release pressure from the thermal battery. In one example at 412, the pressure may be vented through the opening of the vent valve to the coolant system (for example, through vent valve 225 illustrated in FIG. 3). In another example at 414, the pressure may be vented through the opening of the vent valve to the atmosphere (to the ambient environment, for example, through vent valve 222 illustrated in FIG. 2).

The method 400 then proceeds to 415 where the pressure inside the thermal battery is reassessed after opening the vent valve. In one example, the pressure inside the thermal battery may be determined after a specific duration of the vent valve being open at 410.

At 416, if the pressure inside the thermal battery continues to be more than the threshold pressure, the controller continues to maintain the vent valve in the open position at 420, continuing to release pressure from inside the thermal battery. The vent valve is maintained in the open position until the pressure inside the thermal battery is no longer more than the threshold pressure, after which the method 400 ends.

If the pressure is below the threshold pressure at 416, that is if the opening of the vent valve adequately relieves the thermal battery pressure, then the method 400 proceeds to 418, wherein the controller closes the vent valve, sealing the thermal battery and discontinuing the release of pressure from the thermal battery to the coolant system, and/or to ambient. The method 400 then ends.

In this way, the pressure inside a thermal battery may be maintained in a target range by opening or closing a vent valve based on input from a pressure sensor coupled to the heat exchange area of a thermal battery. Minimizing pressure variation allows the melting temperature of the one or more PCMs inside the thermal battery to be maintained, enabling an accurate state of charge determination of the thermal battery. Based on the state of charge of the battery, charging of the battery (for example, by increasing heat source flow to the battery) or discharging of the battery (for example, by increasing coolant flow through the thermal battery for coolant warming) may be performed efficiently.

Figure 5:
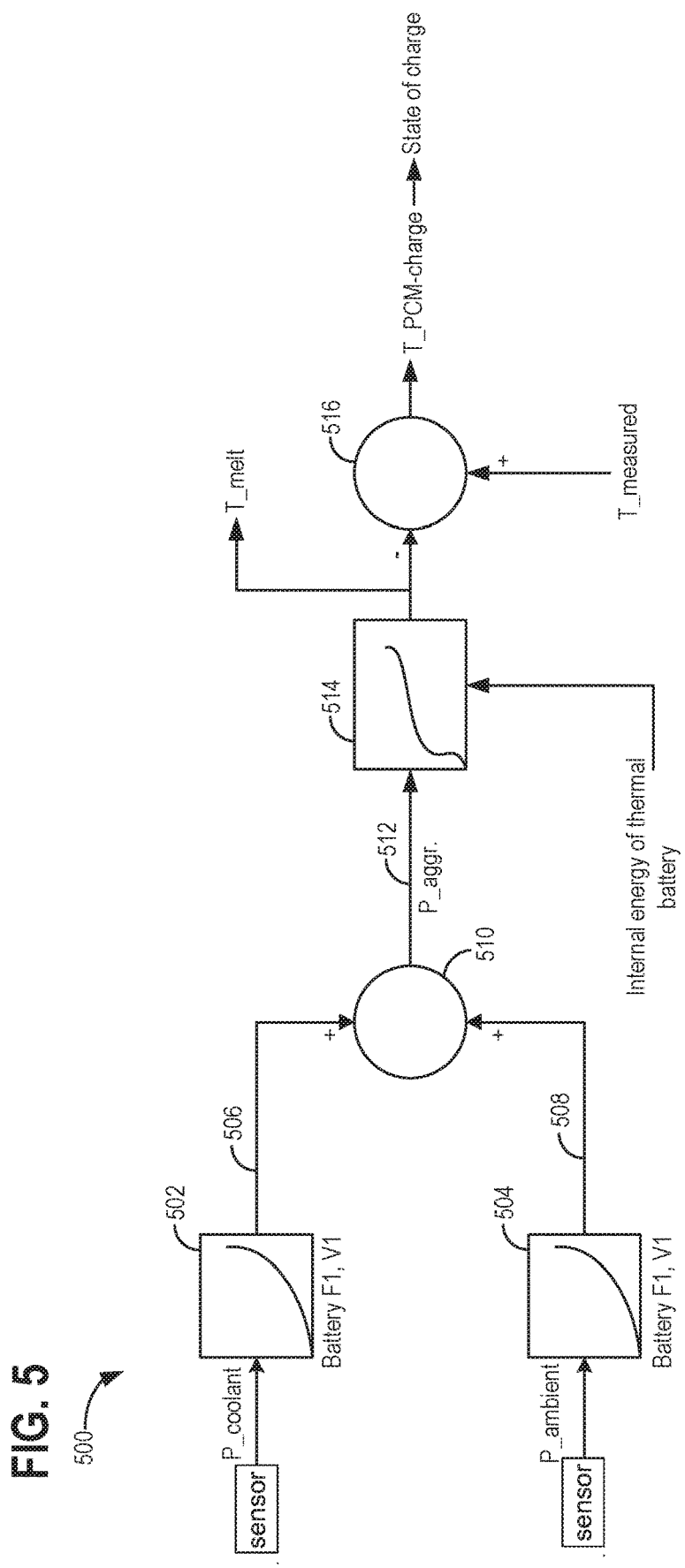
FIG. 5 shows an example control routine for determining the state of charge of a thermal storage device based on an aggregate pressure of the device.

FIG. 5 shows a control scheme 500 that may be implemented by a controller (e.g., the controller 12 as shown in FIG. 1) to determine a state of charge of a thermal battery (e.g., the thermal battery 202 illustrated in FIGS. 2 and 3)

based on an accurate temperature estimation of one or more PCMs inside the heat exchange chamber of the thermal battery. The temperature estimation takes into account the pressure variation in the temperature of a thermal battery.

A first signal corresponding to a pressure of a coolant system fluidically coupled to the thermal battery (P_coolant) is obtained from a pressure sensor coupled to the coolant system. The first signal is used as an input into look-up table 502. A first output signal 506 indicating a pressure of the coolant system for the battery at a defined wall flexibility (F1) and a defined battery void volume (V1) may be derived from the look-up table 502. The battery wall flexibility F1 may depend on a thickness and compliance of the wall enclosing the heat exchange chamber of the thermal battery. The battery void volume V1 may be determined based on a packaging density of the PCM, which is affected by the configuration of heat exchange tubes inside the heat exchange chamber trapping air pockets within the heat exchange chamber. The pressure input to the look-up table (P_coolant) may be an unadjusted pressure while the output of look-up table 502 may be an adjusted or calibrated pressure. In one example, by calibrating the coolant pressure to a defined wall flexibility value F1 and battery void volume V1 of a thermal battery, the pressure may be standardized for a given battery configuration and condition.

A second signal corresponding to an ambient pressure (P_ambient) is obtained from one or more pressure sensors, such as from a barometric pressure sensor coupled to an engine intake passage or coupled to an outer surface of the thermal battery. This second signal may be used as an input into look-up table 504. A second output signal 508 indicating an ambient pressure for the battery at the defined wall flexibility (F1) and the defined battery void volume (V1) may be derived from the look-up table 504. The pressure input to the look-up table (P_ambient) may be an unadjusted pressure while the output of look-up table 504 may be an adjusted or calibrated pressure. In one example, by calibrating the ambient pressure to a defined wall flexibility value F1 and battery void volume V1 of a thermal battery, the pressure may be standardized for a given battery configuration and condition.

An adder 510 may receive the first output signal 506 and the second output signal 508 and add the received signals to derive an aggregate pressure signal 512 (P_aggr.). The aggregate pressure signal 512 reflects the total pressure inside the thermal battery and may be used as an input into look up table 514. A steady state melting temperature of the PCM (T_melt) may be derived from the look up table 514 based on the input aggregate pressure 512 and a total internal energy of the thermal battery computed based on previously estimated or a last estimated state of charge and melting temperature information of the PCM of the thermal battery. In examples where more than one PCM is present inside the thermal battery, a melting temperature of each of the PCMs as well as an overall melting temperature of the thermal battery may be individually determined. In this way, a melting temperature of a thermal battery is updated to account for pressure-based temperature variations, such as variations arising from changes in altitude of operation as well as changes in coolant flow through the battery. Each of look-up tables 502, 504, and 514 may be calibrated, with the cells of the tables being continually populated and updated during battery operation. In one example, as the ambient pressure increases, such as due to a drop in the altitude of vehicle operation, a pressure inside the thermal battery (at a given void volume and flexibility) increases correspondingly. As another example, as the pressure of coolant in the engine system increases due to increasing temperature of the system, and/or depending on fill level of the coolant system (coolant leaks or coolant addition at a service interval may change the fill level), the pressure inside the thermal battery (at the given void volume and flexibility) correspondingly changes. In this way, by accounting for the pressure variation, the melting temperature of the thermal battery and its individual PCMs may be estimated more reliably, improving battery control.

Continuing with control scheme 500, a controller 516 (such as a comparator) may receive the pressure-adjusted melting temperature of the PCM (T_melt), and a measured temperature of the PCM (T_measured). The measured temperature may be based on input from a temperature sensor coupled to the thermal battery, for example, temperature sensor 230 illustrated in FIGS. 2 and 3. In another example, T_measured may be based on input from a temperature sensor positioned at the coolant outlet tube of the thermal battery, the temperature sensor measuring a temperature of coolant flowing out of the battery when the PCM inside the battery and the coolant flowing there-through are in thermal equilibrium. In one example, the controller may stop coolant flow through the thermal battery for a duration to enable thermal equilibrium between the coolant and the PCM. After the duration, the controller may resume flowing the coolant through the thermal battery. At this time, the coolant temperature may reflect the PCM temperature, and therefore the coolant temperature may be measured and used to infer the PCM temperature (or battery temperature). In another example, when the coolant and the PCM are not in thermal equilibrium, the PCM temperature and the state of charge of the thermal battery may still be estimated by modeling the heat transfer based on fluid flow rates and the inlet and outlet temperature measurements.

The controller 516 may compute a difference between T_measured and T_melt to derive the temperature of superheated or supercooled PCM (T_PCM-charge). If T_measured is greater than T_melt, the T_PCM-charge indicates that the PCM is superheated (that is, the PCM is in liquid state with trapped latent heat). However if the T_measured is less than T_melt, the T_PCM-charge reflects temperature of supercooled PCM (that is, the PCM is in solid state with no latent heat trapped). Most of the energy of the thermal battery is stored in the phase change region, meaning that when the PCM is supercooled (in solid state), the battery is at a lower state of charge compared to when the PCM is superheated (liquid state), and the battery is at a higher state of charge.

Based on a difference between the measured temperature of the PCM and the pressure-adjusted melting temperature of the PCM, the controller may determine a state of charge of the thermal battery. For example, the controller may rely on a function that uses the difference as an input and generates the state of charge as an output. The state of charge of the thermal battery thus derived has a higher accuracy as the variation of the melting temperature of the PCM due to changes in battery pressure are taken into consideration. As such, the state of charge estimated in this manner may be more accurate than a state of charge estimated based solely on the measured temperature of the PCM.

As a first example, if T_measured is 100° C. and the T_melt of the PCM is 85° C., the 15° C. difference between T_melt and T_measured reflects the energy trapped (latent heat+sensible heat) in the superheated PCM. In contrast, in a second example, the T_measured continues to be 100° C. but the T_melt of the PCM changes to 105° C. due to an increase in pressure inside the thermal battery. The difference between T_melt and T_measured reflects that the PCM is superheated (that is, the PCM is in liquid state with trapped latent heat) in the first example but that the PCM is super-cooled (that is, the PCM is in a solid state with no latent heat trapped) in the second example. Thus, in the first example, the thermal battery has stored latent heat and therefore may be capable of releasing/transferring thermal energy from the higher temperature battery to a lower temperature unit) while in the second example, the thermal battery does not have stored latent heat, even though the T_measured is same in both the first example and the second example. Therefore, an accurate state of charge of the thermal battery may be derived by the controller taking into consideration the change in melting temperature of the PCM with a change in aggregate pressure inside the thermal battery.

Figure 6:
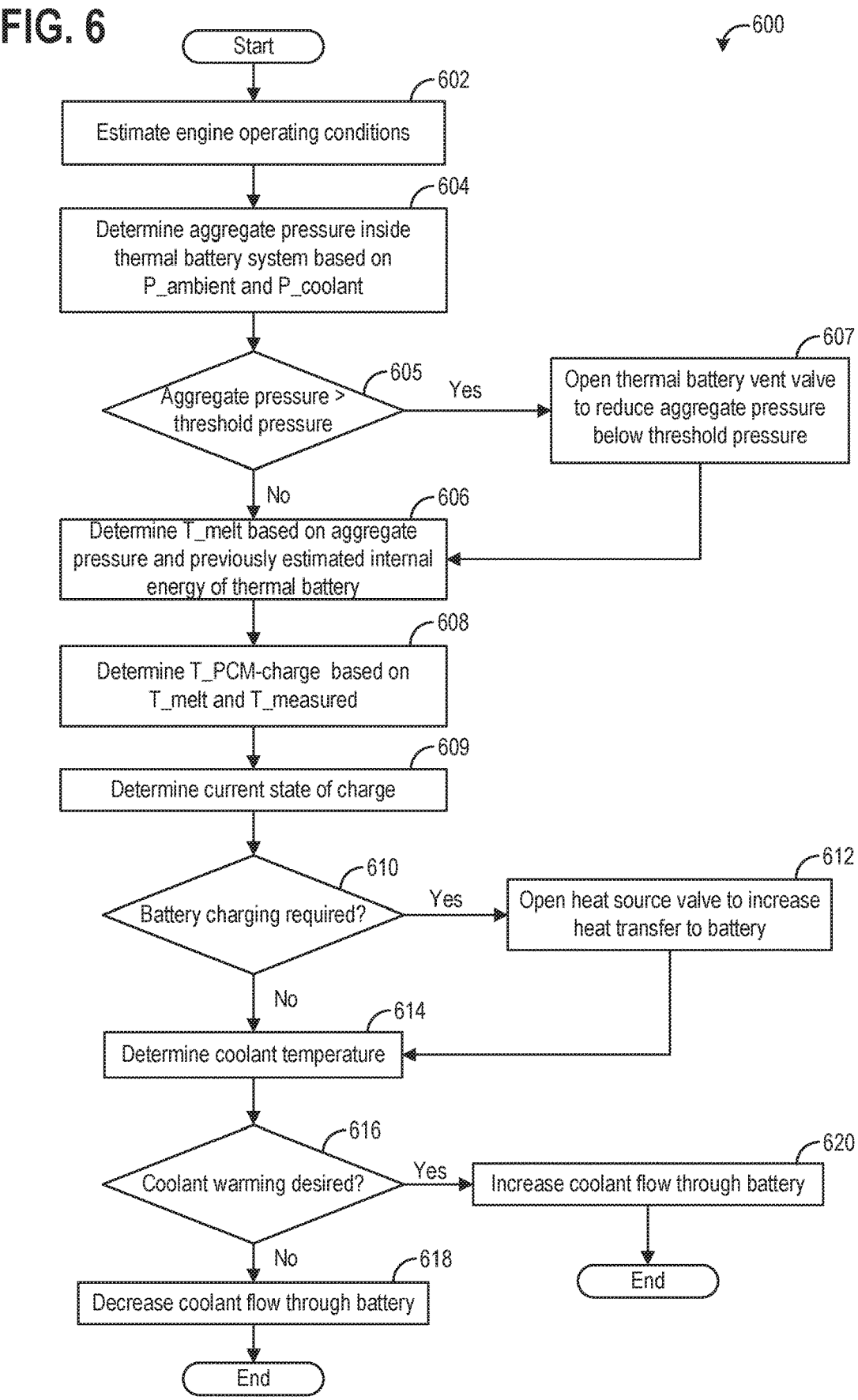
FIG. 6 shows an example method for regulating a state of charge of a thermal storage device.

FIG. 6 shows an example method 600 for regulating coolant flow through a thermal battery based on the state of charge of the battery. In one example, the state of charge determined may be of the thermal storage device 50 shown in FIGS. 1A and 1B, and thermal battery 202 shown in FIGS. 2 and 3. The method of FIG. 6 may reflect steps similar to those described with reference to the control scheme 500 of FIG. 5.

Instructions for executing method 600 and all other methods described herein with reference to FIG. 6 may be stored in the memory of a controller (e.g., the controller 12 shown in FIGS. 1A and 1B). Therefore, method 600 and all other methods described herein may be executed by the controller based on the instructions stored in the memory of the controller and in conjunction with signals received from sensors of the engine system, such as the pressure sensor 232 and temperature sensor 230, described above with reference to FIGS. 2 and 3. The controller may send signals to regulate the position of a heat source valve and a coolant flow valve based on a state of charge of the battery and based on a coolant temperature of the battery.

At 602, method 600 includes estimating and/or measuring engine operating conditions. Engine operating conditions estimated may include, as non-limiting example, an engine speed, driver torque demand, engine coolant temperature, a temperature inside the thermal battery, a coolant mass flow, a pressure inside the thermal battery, a state of charge of the thermal battery, exhaust gas temperature, a speed of the heat source pump, positions of the one or more valves, etc.

After estimating and/or measuring engine operating conditions, at 604 the method includes estimating an aggregate pressure inside the thermal battery. In one example, the aggregate pressure inside the thermal battery may be determined as a function of each of a pressure of the coolant system, and an ambient pressure surrounding the thermal battery. Additionally, a thickness of a wall of the thermal battery and a void volume inside the thermal battery may accommodate an increase in pressure inside the thermal battery, thereby contributing to the aggregate pressure inside the thermal battery.

At 605, the method includes determining if the aggregate pressure is more than a threshold pressure. The threshold pressure may indicate a maximum pressure of the thermal battery beyond which the integrity of the thermal battery may be compromised (for example, the battery may leak, or burst).

If the aggregate pressure is more than the threshold pressure, at 607, the method includes opening a vent valve of the thermal battery to release the pressure built inside the thermal battery. The controller may maintain the vent valve in an open position for a predetermined fixed duration or until the aggregate pressure drops below the threshold pressure. The method 600 proceeds to 606.

If the aggregate pressure inside the thermal battery is not more than the threshold pressure, the method 600 proceeds to 606. At 606, the method 600 determines the steady state melting temperature of the PCM (T_melt) based on the aggregate pressure and a previously estimated internal energy state of the battery (e.g., most recent estimate based on most recent estimate of the state of charge and melting temperature of the PCM). Alternatively, a previously estimated melting temperature or measured pressure along with the previously estimated state of charge may be used to compute the current state of charge of the thermal battery based on the current aggregate pressure and current T_melt. In one example, when more than one PCM is present inside the thermal battery, the melting temperature (T_melt) of each of the constituent PCMs of the battery may be determined based on the PCM material properties, including melting temperature at a specific pressure, and the specific state of charge of the battery.

At 608, the method includes determining a temperature of the superheated and/or super-cooled state of the PCM (T_PCM-charge) based on a difference between the measured temperature of the PCM (T_measured) and the pressure-adjusted melting temperature (T_melt) derived at 606. T_measured may be based on input from a temperature sensor coupled to the heat exchange area containing the PCM, for example temperature sensor 230 of FIG. 2. The T_PCM-charge reflects the latent heat and sensible heat trapped in the PCM inside the thermal battery. Latent heat makes up the majority of the energy storage and it is trapped during the transition between the supercooled to superheated PCM. Sensible heat is stored or removed when the temperature is moved away from the transition region.

The method 600 then proceeds to 609 wherein the routine includes determining the state of charge of the battery based on the T_PCM-charge determined at 608. An increase in T_PCM-charge relative to the T_melt of the PCM indicates an increase in the state of charge while a decrease in T_PCM-charge relative to the T_melt reflects a decrease in the state of charge of the thermal battery.

At 610, the method includes determining if battery charging is required. For example, battery charging may be required when the state of charge of the battery is less than a threshold state of charge, such as less than 20%. If battery charging is required, then method 600 may proceed to 612 to open a heat source valve to increase heat transfer to the battery. Specifically, charging the battery at 612 may include increasing power supplied to the heat source pump, to increase the pump speed, and therefore increase fluid flow and therefore heat transfer, between the engine exhaust and the thermal battery. Additionally or alternatively, at 612, charging the battery may include increasing an opening formed by the heat source valve to increase fluid flow between the engine exhaust and the thermal battery. In this way, an amount of thermal energy transferred from the exhaust to the thermal battery may be increased at 612.

Method 600 may then continue from, either 612 or from 610 (if it is determined at 610 that battery charging is not desired), to 614, which comprises estimating a temperature of coolant exiting the battery. The temperature of the coolant may be estimated based on outputs from one or more temperature sensors positioned along the coolant system. The temperature sensor may be positioned to measure temperature representative of the coolant flowing through the coolant system coupled to the thermal battery.

After estimating the coolant temperature, the method 600 may then continue from 614 to 616, which may comprise determining if coolant warming is desired. Coolant warming may be desired when the estimated coolant temperature is less than a desired coolant temperature. A desired coolant temperature may be determined based on engine operating conditions, such as engine temperature, cabin temperature, etc. For example, in response to an increase in desired cabin temperature (or a decrease in engine cooling demand), the desired coolant temperature may increase.

If the coolant temperature is less than desired and coolant warming is desired, method 600 may proceed from 616 to 620, which comprises increasing coolant flow through the battery. As described above, one or more of the first coolant valve and/or second coolant valve may be opened to increase coolant flow through the battery. Due to the increased coolant flow through the battery, the temperature of the coolant may be increased. Further, the rate of warming of the coolant may increase.

However, if at 616 it is determined that coolant warming is not desired, then the method 600 may proceed from 616 to 618, which comprises decreasing coolant flow through the battery. In one example, coolant warming may not be desired responsive to an increase in engine cooling demand, or an anticipated increase in cooling demand, such as during a vehicle key-on event.

As described above, one or more of the first coolant valve and/or second coolant valve may be at least partially closed to decrease coolant flow through the battery. Due to the decreased coolant flow through the battery, the temperature of the coolant may be maintained and/or decreased. In some examples, the rate of warming of the coolant may be reduced. In yet further examples, the method 600 at 618 may comprise stopping coolant flow through the battery. In other examples, the method 600 at 618 may comprise maintaining coolant flow at its current flow rate. After executing either 620 or 618, method 600 may end.

In this way, a state of charge of a thermal battery may be more reliably determined based on a measured temperature of coolant circulating through the battery by accounting for temperature fluctuations caused by pressure variations at the battery. Consequently, the charging of the thermal battery and warming of coolant flowing through the thermal battery may be efficiently regulated based on the more accurate determination of the state of charge of the battery.

Figure 7:
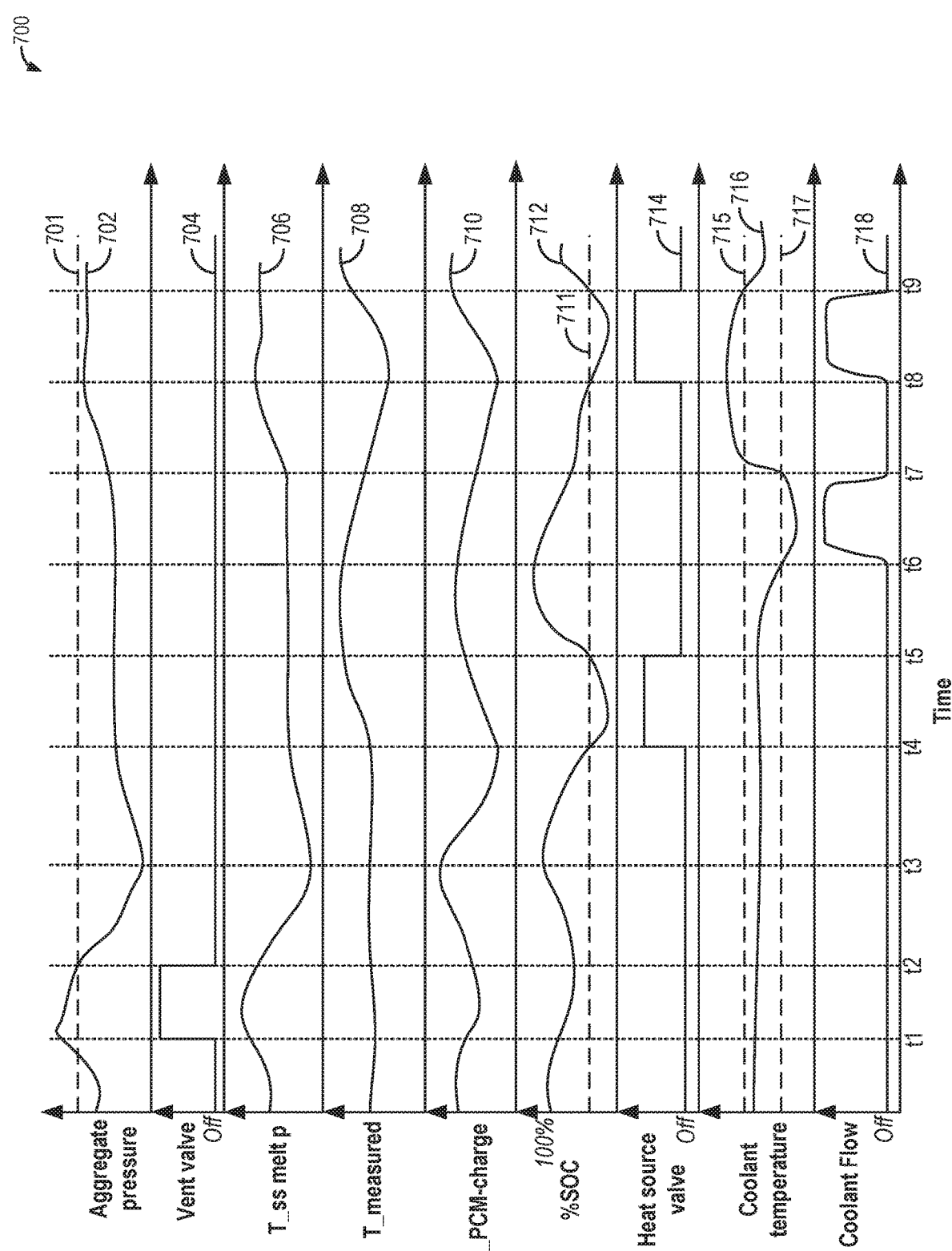
FIG. 7 shows an operational map illustrating example pressure and temperature variations, and corresponding coolant flow adjustments, at a thermal storage device.

Turning now to FIG. 7, it shows a graph 700 depicting changes in coolant flow through a thermal battery (e.g., the thermal battery 202 shown in FIGS. 2 and 3) during varying engine operating conditions. Specifically, aggregate pressure inside the battery is shown at plot 702. As described above with reference to FIGS. 5 and 6, aggregate pressure may be determined as a function of each of a pressure of the coolant system, an ambient pressure, a thickness of the wall of the thermal battery, and a void volume inside the battery. A position of a vent valve coupled to the battery chamber to release pressure from the thermal battery is shown at plot 704. A melting temperature (T_melt), a measured temperature (T_measured), and a pressure-adjusted temperature (T_PCM-charge) of the PCM are illustrated at plots 706, 708, and 710, respectively. A state of charge (state of charge) of the battery may be obtained based on T_PCM-charge and is illustrated at plot 712. A position of a heat source valve (e.g., the valve 120 shown in FIG. 1B) is shown at plot 714. The heat source valve may be opened to circulate a fluid between an exhaust passage (e.g., the exhaust passage 48 shown in FIGS. 1A and 1B) and the thermal battery for transferring thermal energy from the warmer exhaust gasses to the cooler thermal battery. Specifically, the heat source valve may be adjusted between a closed first position, where approximately no fluid flows there-through and substantially no heat is transferred to the thermal battery, and an open second position, where fluid flows through the valve and heat is added to the thermal battery. Plot 716 depicts a coolant temperature and plot 718 shows coolant flow through the thermal battery regulated by controlling a position of a coolant flow valve.

Prior to t1, the aggregate pressure of the battery may be below a threshold pressure 701. The vent valve may be in a closed position, as no release of pressure from the thermal battery is needed. The state of charge of the thermal battery is close to fully charged (100%) and the T_PCM-charge, T_measured, and T_melt values may reflect the elevated state of charge. As the battery is almost fully charged prior to t1, the heat source valve is at a closed position as no heating/charging of the battery is required. The coolant temperature is adjusted based on cooling demand and is between first (lower) threshold 717 and second (upper) threshold 715. At this time, no coolant warming is desired, and consequently coolant flow through the thermal battery may be disabled, as indicated at plot 718.

At t1, the aggregate pressure increases to above the threshold pressure 701 due to a change in altitude of vehicle operation (such as due to a drop in altitude). Responsive to the rise in aggregate pressure inside the battery, the vent valve (plot 704) is opened to vent the excess pressure inside the thermal battery. Between t1 and t2, the vent valve remains open releasing pressure from the thermal battery, either to the coolant system, and/or to ambient. The T_melt estimate increases with the increase in aggregate pressure and as the aggregate pressure comes down between t1 and t2, the T_melt correspondingly decreases. The T_measured may not change during t1-t2, and the T_PCM-charge (difference between T-measured and T_melt) may follow a trend that is similar to the change in T_melt. The state of charge may correspondingly decrease between t1-t2 while staying above charge threshold 711. As no charging of the thermal battery is required at this time, the controller maintains the heat source valve (plot 712) at the closed position. Coolant temperature (plot 718) is maintained between first threshold 717 and second threshold 715 (for example, due to the coolant not heating vehicle components) and hence, no coolant warming is needed. Therefore no increase in coolant flow to the thermal battery is seen (plot 718) during t1-t2.

At t2, the aggregate pressure is at the threshold pressure, and no further release of pressure from the thermal battery is required. Responsive to the drop in aggregate pressure, the controller sends a signal to close the vent valve at t2. Between t2 and t3, the aggregate pressure continues to decrease, even though the vent valve is closed. The aggregate pressure may decrease, for example, due to a decrease in the coolant pressure and/or due to a drop in the ambient pressure. The drop in ambient pressure may be due to the vehicle operating at a higher altitude. The drop in coolant pressure may be due to a temperature change in the coolant system. T_melt (plot 706) decreases as the aggregate pressure decreases between t2 and t3. T_measured may remain unchanged. As a result, the value of T_PCM-charge may increase between t2 and t3. The increase in T_PCM-charge increases the state of charge (plot 712) of the battery. The heat source valve remains closed as the state of charge is above the charge threshold 711, and no heating of the thermal battery is required. Also during t2-t3, the coolant temperature may remain between the first and the second threshold, not requiring warming. The coolant flow to the thermal battery may therefore continue to remain off.

During t3-t4, the aggregate pressure increases, but is still below the threshold pressure 701, and therefore the vent valve is maintained in the closed position. As aggregate pressure increases again, a corresponding increase in T_melt is observed during t3-t4. Since the T_measured remains unchanged, the T_PCM-charge decreases during t3-t4, and so does the state of charge of the battery, gradually approaching the charge threshold 711 by t4. The heat source valve is maintained at the closed position during t3-t4. However, responsive to the state of charge reaching the charge threshold 711 at t4, the heat source valve is opened. The open heat source valve enables heat transfer from exhaust to the PCM, increasing T_measured and T_PCM-charge and consequently increasing the state of charge of the battery during t4-t5. No increase in coolant flow is observed between t4 and t5 as the coolant temperature remains between the first and second threshold.

At t5, the state of charge of the thermal battery is at the charge threshold, and no further charging/heating of the thermal battery is required. Hence, the heat source valve is closed by the controller at t5. Between t5-t6, the aggregate pressure remains constant and below the threshold pressure. The vent valve continues to be maintained in the closed position during t5-t6. The T_melt does not change during t5-t6, and the T_measured and T_PCM-charge show minimal change during the same time. The state of charge continues to be above the charge threshold between t5-t6, responsive to which the heat source valve continues to be in the closed position. The coolant temperature starts decreasing closer to t6, (for example, due to a request for passenger cabin warming which draws heat from the coolant), while remaining above the threshold. Hence, the coolant valve continues to be in the closed position at this time.

At t6, the coolant temperature falls below the first threshold temperature 717. In response to the coolant temperature falling below the first threshold temperature, coolant flow to the thermal battery is increased to heat the coolant between t6-t7. The coolant extracts thermal energy from the thermal battery, decreasing the state of charge of the battery, and resulting in a drop of T_measured and T_PCM-charge while T_melt, and the aggregate pressure remain unchanged. Consequently the vent valve continues to remain closed during t6-t7.

At t7, the coolant temperature reaches the first threshold 717, and in response, the coolant flow through the thermal battery is suspended. The coolant temperature continues to rise and crosses the second threshold 715 after t7. The aggregate pressure at t7 increases and approaches the threshold pressure during t7-t8. Since the increased aggregate pressure is still below the threshold pressure during t7-t8, the vent valve continues to be maintained in the closed position. The T_melt increases with corresponding increase in aggregate pressure during t7-t8. The T_measured may decrease along with a corresponding decrease in T_superheated. Hence, the state of charge of the thermal battery also decreases during t7-t8.

At t8, the coolant temperature may be above the second threshold, and the state of charge may be at the charge threshold 711, requiring charging of the battery while no coolant warming is desired. Based on the state of charge at the charge threshold and the coolant temperature above the second threshold, the heat source valve may be opened and coolant flow valve may be opened at t8. During t8-t9, coolant flow through the thermal battery increases, transferring heat from the coolant to the thermal battery. The open heat source valve also heats the battery, increasing the state of charge, T_measured, and T_PCM-charge of the PCM during t8-t9. The aggregate pressure and the corresponding T_melt continue to remain constant between t8-t9. At t9, the coolant temperature falls below the second threshold 715 and the state of charge reaches the charge threshold, resulting in closing of the heat source valve and the coolant flow valve at t9.

Thus, a state of charge of a thermal battery may be accurately determined by one or more of minimizing pressure variation inside the thermal battery and determining a variation in melting temperature of one or more PCMs with variation in pressure inside the thermal battery. Based on the state of charge of the battery and further based on coolant temperature, the battery may be efficiently charged for performing coolant warming when required.

In this way, by accounting for pressure variations and their impact on the temperature of PCM, the melting temperature of a thermal battery and its constituent PCMs may be more accurately determined. The technical effect of accurately determining the state of charge of a thermal battery is that the charging/discharging cycles of the thermal battery may be better regulated. In addition, use of the thermal battery for regulating a coolant temperature in heat exchange relationship with the PCM of the thermal battery is improved. This, in turn, increases the heating efficiency of the coolant by the thermal battery. By using the heated coolant to expedite heating of various vehicle components (such as an engine block, a passenger cabin, etc.), vehicle performance and vehicle occupant comfort is enhanced while improving vehicle fuel economy.

One example method comprises: estimating an aggregate pressure of a thermal battery coupled to an engine coolant system as a function of each of an ambient pressure and a pressure of coolant circulating through the thermal battery; and determining a state of charge of the battery based on a melting temperature and one or more chemical properties of a phase change material (or two or more phase change materials) included within the thermal battery, the melting temperature inferred based on the estimated aggregate pressure. In the preceding example, additionally or optionally, the state of charge is further determined based on a measured temperature of the battery, the temperature of the battery estimated based on output from a temperature sensor coupled to a coolant outlet of the battery, the temperature sensor configured to measure a temperature of coolant exiting the battery. In any or all of the preceding examples, additionally or optionally, the method further comprises, in response to the aggregate pressure being higher than a threshold, opening a vent valve of the thermal battery, wherein the two or more phase change materials are sealed in a chamber inside the thermal battery, and wherein the vent valve is coupled to the chamber. In any or all of the preceding examples, additionally or optionally, the vent valve fluidically couples the chamber to atmosphere and wherein opening the vent valve includes venting the thermal battery to atmosphere until the aggregate pressure is below the threshold. In any or all of the preceding examples, additionally or optionally, the vent valve fluidically couples the chamber to the engine coolant system and wherein opening the vent valve includes venting the thermal battery to the coolant system until the aggregate pressure is below the threshold. In any or all of the preceding examples, additionally or optionally, the chamber is separated from a housing of the thermal battery by an encapsulation void, and wherein the aggregate pressure is further estimated as a function of the encapsulation void and a thickness of the chamber. In any or all of the preceding examples, additionally or optionally, the determining the state of charge of the battery is based on the measured temperature relative to the melting temperature, and a first transfer function when the battery is charging, and wherein the determining the state of charge of the battery is based on the measured temperature relative to the melting temperature, and a second transfer function when the battery is discharging. In any or all of the preceding examples, additionally or optionally, the method further comprises, estimating a superheated temperature and a supercooled temperature of the thermal battery based on the measured temperature and the melting temperature of each of the two or more PCMs for determining the state of charge of the thermal battery. In any or all of the preceding examples, additionally or optionally, the method further comprises, responsive to the determined state of charge being lower than a threshold charge, opening a heat exchange valve of a heat exchange loop fluidically coupling an engine exhaust passage to the thermal battery via coolant flow to transfer thermal energy from the exhaust passage to the thermal battery. In any or all of the preceding examples, additionally or optionally, the thermal battery is coupled in a vehicle, and the method further comprises, responsive to a request for vehicle cabin heating, opening a coolant valve to transfer thermal energy from the thermal battery to the engine coolant system, and increasing circulation of heated coolant through the vehicle cabin.

Another example method comprises: estimating a melting temperature of a thermal battery coupled to an engine coolant system based on chemical properties of two or more phase change materials included within the thermal battery, and further based on an aggregate pressure within the thermal battery; estimating a state of charge of the battery based on the melting temperature relative to a measured temperature of the battery; and adjusting coolant flow through the battery based on the estimated state of charge. In the preceding example, additionally or optionally, the aggregate pressure within the thermal battery is based on each of a coolant system pressure, an ambient pressure, and a position of a vent valve coupled to a chamber of the battery, the chamber housing the two or more phase change materials. In any or all of the preceding examples, additionally or optionally, the adjusting includes increasing an opening of a heat exchange valve in response to a drop in the estimated state of charge to increase circulation of heated coolant through the battery, the coolant heated via passage through an engine exhaust passage. In any or all of the preceding examples, additionally or optionally, the adjusting includes increasing an opening of a coolant valve in response to a rise in the estimated state of charge to increase circulation of coolant through the battery, the coolant heated upon passage through the battery. In any or all of the preceding examples, additionally or optionally, the method further comprising, estimating a superheated temperature and a supercooled temperature of the thermal battery based on the melting temperature, and further adjusting the coolant flow responsive to the measured temperature of the battery relative to each of the superheated temperature and a supercooled temperature based on the melting temperature of each of a two or more PCMs of the device. In any or all of the preceding examples, additionally or optionally, the measured temperature of the battery is calculated based on a measured temperature of coolant exiting a coolant outlet of the battery. In any or all of the preceding examples, additionally or optionally, the measured temperature of the battery calculated based on the measured temperature of coolant includes: stopping the coolant flow through the thermal battery for a duration; resuming the coolant flow through the thermal battery after the duration; estimating the measured temperature of coolant exiting the coolant outlet of the battery based on outputs from a temperature sensor positioned proximate the coolant outlet; and calculating the measured temperature of the battery based on the measured temperature of the coolant exiting the battery.

Another example vehicle system comprises: an engine including a coolant circuit; a thermal storage device including a first phase change material having a first phase change temperature, a second phase change material having a second, different phase change temperature; and a vent valve coupling the device to atmosphere; a coolant valve coupling the thermal storage device to the engine coolant circuit; a temperature sensor for estimating a temperature of the device; a first pressure sensor for estimating a pressure inside the device; a second pressure sensor for estimating an ambient pressure outside the device; and a controller. The controller may be configured with non-transitory computer readable instructions for: estimating a melting temperature of the device based on inputs from each of the temperature sensor, the first pressure sensor, and the second pressure sensor; inferring a state of charge of the device based on the estimated melting temperature; and adjusting a position of the coolant valve based on each of the state of charge of the device and a demand for coolant heating. In any or all of the preceding examples, additionally or optionally, the estimating includes estimating an aggregate pressure inside the device as a function of the inputs from each of the first and second pressure sensor, and converting the aggregate pressure and a last estimated internal energy state of the device to the melting temperature of the device. In any or all of the preceding examples, additionally or optionally, the adjusting includes: increasing an opening of the valve as the inferred state of charge falls below a threshold; and increasing the opening of the valve as the demand for coolant heating increases while the state of charge of the battery is above the threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle controller operable to regulate coolant flow through a battery, the method comprising:
   at the vehicle controller:
      receiving an ambient pressure sensor signal from an ambient pressure sensor;
      adjusting the ambient pressure sensor signal as a function of each of a defined battery void volume and a defined wall flexibility value;
      receiving an internal pressure sensor signal measuring coolant circulating through the battery from an internal pressure sensor, the battery coupled to an engine coolant system;
      adjusting the internal pressure sensor signal as a function of each of the defined battery void volume and the defined wall flexibility value;
      determining an aggregate pressure signal of the battery as a function of each of the adjusted ambient pressure sensor signal and the adjusted internal pressure sensor signal;
      determining a melting temperature of two or more phase change materials based on the aggregate pressure signal;
      inferring a state of charge of the battery, the state of charge of the battery being inferred based on the determined melting temperature and one or more chemical properties of the two or more phase change materials included within the battery; and
      adjusting coolant flow through the battery in response to the inferred state of charge of the battery, including, responsive to the inferred state of charge of the battery decreasing below a threshold state of charge, opening a heat exchange valve of a heat exchange loop fluidically coupling an engine exhaust passage to the battery via the coolant flow to transfer thermal energy from the engine exhaust passage to the battery.

2. The method of claim 1, wherein the inferring of the state of charge of the battery is further based on a comparison of the determined melting temperature and a measured temperature of the battery, the temperature of the battery measured based on output from a temperature sensor coupled to a coolant outlet of the battery, the temperature sensor configured to measure a temperature of coolant exiting the battery, and
   wherein the heat exchange valve is opened in respective circumstances where the measured temperature of the battery is maintained and decreased immediately prior to opening the heat exchange valve.

3. The method of claim 2, further comprising estimating a superheated temperature and a supercooled temperature of the battery based on the measured temperature of the battery and the determined melting temperature of each of the two or more phase change materials.

4. The method of claim 1, further comprising, in response to the aggregate pressure signal being higher than a threshold pressure value based on the one or more chemical properties of the two or more phase change materials, opening a vent valve of the battery,
   wherein the two or more phase change materials are sealed in a chamber inside the battery, and
   wherein the vent valve is coupled to the chamber.

5. The method of claim 4, wherein the vent valve fluidically couples the chamber to atmosphere, and
   wherein opening the vent valve includes venting the battery to atmosphere until the aggregate pressure signal is below the threshold pressure value, and the threshold pressure value is further based on a maximum battery pressure.

6. The method of claim 4, wherein the vent valve fluidically couples the chamber to the engine coolant system, and
   wherein opening the vent valve includes venting the battery to the engine coolant system until the aggregate pressure signal is below the threshold pressure value, and the threshold pressure value is further based on a maximum battery pressure.

7. The method of claim 1, wherein determining the melting temperature of the two or more phase change materials is further based on a most recently determined melting temperature and a most recently inferred state of charge.

8. The method of claim 1, wherein the melting temperature is only determined if the aggregate pressure signal is below a threshold pressure value,
   wherein the heat exchange valve is a continuously variable valve, and
   wherein a position of the heat exchange valve is varied proportionally to the inferred state of charge.

9. A method for a vehicle controller operable to regulate coolant flow through a thermal battery, the method comprising:
   at the vehicle controller:
      measuring a coolant pressure within the thermal battery based on a coolant pressure signal received from a first pressure sensor;
      adjusting the coolant pressure within the thermal battery according to a defined battery void volume and a defined wall flexibility value;
      measuring an ambient pressure based on an ambient pressure signal received from a second pressure sensor;
      adjusting the ambient pressure according to the defined battery void volume and the defined wall flexibility value;
      measuring a temperature of the thermal battery based on a temperature signal received from a temperature sensor;
      estimating a melting temperature of two or more phase change materials included within the thermal battery, the melting temperature being estimated based on chemical properties of the two or more phase change materials, the adjusted coolant pressure within the thermal battery, the adjusted ambient pressure, and a position of a vent valve coupled to the thermal battery;
wherein the thermal battery is coupled to an engine coolant system;
estimating a state of charge of the thermal battery based on the estimated melting temperature of the two or more phase change materials in comparison to the measured temperature of the thermal battery; and
adjusting coolant flow through the thermal battery based on the estimated state of charge of the thermal battery, including:
responsive to a drop in the estimated state of charge of the thermal battery to less than a threshold state of charge, increasing an opening of a heat exchange valve to increase circulation of coolant through the thermal battery, the coolant heated via passage through an engine exhaust passage, and
responsive to a rise in the estimated state of charge of the thermal battery, increasing an opening of a coolant valve to increase the circulation of the coolant through the thermal battery,
wherein the heat exchange valve is different than the coolant valve.

10. The method of claim 9, wherein the melting temperature being estimated based on the adjusted coolant pressure within the thermal battery and the adjusted ambient pressure includes the melting temperature being estimated based on a sum of the adjusted coolant pressure within the thermal battery and the adjusted ambient pressure, and
wherein opening the heat exchange valve comprises opening the heat exchange valve immediately following the measured temperature of the thermal battery being maintained and not increasing or decreasing for a duration.

11. The method of claim 9, wherein the estimating of the melting temperature is only performed when a sum of the adjusted coolant pressure within the thermal battery and the adjusted ambient pressure is below a threshold,
wherein the coolant is heated upon passage through the thermal battery when the opening of the coolant valve is increased in response to the rise in the estimated state of charge of the thermal battery, and
wherein opening the coolant valve comprises opening the coolant valve immediately following the measured temperature of the thermal battery being maintained and not increasing or decreasing for a duration.

12. The method of claim 9, further comprising estimating a superheated temperature and a supercooled temperature of the thermal battery based on the estimated melting temperature of the two or more phase change materials, and further adjusting the coolant flow responsive to the measured temperature of the thermal battery relative to each of the superheated temperature and the supercooled temperature.

13. The method of claim 9, wherein the measured temperature of the thermal battery is calculated based on a measured temperature at a coolant outlet of the thermal battery.

14. The method of claim 9, wherein the estimating of the melting temperature of the two or more phase change materials thermal battery is further based on a most recently estimated melting temperature of the two or more phase change materials.

15. The method of claim 13, wherein calculating the measured temperature of the thermal battery based on the measured temperature of coolant exiting the coolant outlet of the thermal battery includes:

stopping the coolant flow through the thermal battery for a duration;
resuming the coolant flow through the thermal battery after the duration;
estimating the measured temperature of coolant of the resumed coolant flow based on outputs from a temperature sensor positioned proximate the coolant outlet; and
calculating the measured temperature of the thermal battery based on the measured temperature of the coolant exiting the thermal battery.

16. A vehicle system, comprising:
an engine including a coolant circuit;
a thermal storage device including a first phase change material having a first phase change temperature, and a second phase change material having a second, different phase change temperature, the second phase change temperature being different from the first phase change temperature;
a vent valve coupling the thermal storage device to atmosphere;
a coolant valve coupling the thermal storage device to the coolant circuit;
a temperature sensor for estimating a temperature of the thermal storage device;
a first pressure sensor for estimating a pressure of a coolant in the thermal storage device;
a second pressure sensor for estimating an ambient pressure outside the thermal storage device; and
a controller with non-transitory computer readable instructions, the instructions executable to:
adjust a first input from each of the first pressure sensor and the second pressure sensor according to a defined battery void volume and a defined wall flexibility value;
estimate a melting temperature of the thermal storage device based on each of a first input from the temperature sensor and the adjusted first inputs from the first pressure sensor and the second pressure sensor;
infer a state of charge of the thermal storage device, the state of charge of the thermal storage device being inferred based on the estimated melting temperature of the thermal storage device; and
adjust a position of the coolant valve based on each of the inferred state of charge of the thermal storage device and a demand for coolant heating, including:
increasing an opening of the coolant valve as the inferred state of charge of the thermal storage device falls below a threshold state of charge, and
increasing the opening of the coolant valve as the demand for coolant heating increases above a demand threshold while the inferred state of charge of the thermal storage device is above the threshold state of charge.

17. The system of claim 16, wherein the estimating of the melting temperature of the thermal storage device is further based on a last estimated melting temperature of the thermal storage device, the last estimated melting temperature of the thermal storage device being based on second inputs from each of the temperature sensor, the first pressure sensor, and the second pressure sensor, where the second inputs are measured prior to the first inputs, and where the second inputs from the first pressure sensor and the second pressure sensor are adjusted according to the defined battery void volume and the defined wall flexibility value.

18. The system of claim 16, wherein the threshold state of charge is nonzero,
- wherein the coolant valve is a continuously variable valve,
- wherein the opening of the coolant valve as the inferred state of charge falls below the threshold state of charge is increased proportionally to the inferred state of charge decreasing, and
- wherein the opening of the coolant valve as the demand for coolant heating increases above the demand threshold while the inferred state of charge is above the threshold state of charge is increased proportionally to the demand for coolant heating increasing.

19. The system of claim 16, wherein the estimating of the melting temperature is only performed when a sum of the first inputs from each of the first pressure sensor and the second pressure sensor is below a threshold pressure value.

* * * * *